United States Patent
Harris

(10) Patent No.: US 9,918,051 B2
(45) Date of Patent: Mar. 13, 2018

(54) SYSTEM FOR GENERATING AN ANAMORPHIC IMAGE FROM A NON-ANAMORPHIC IMAGE

(71) Applicant: Frank William Harris, Lake Oswego, OR (US)

(72) Inventor: Frank William Harris, Lake Oswego, OR (US)

(*) Notice: Subject to any disclaimer, the term of this patent is extended or adjusted under 35 U.S.C. 154(b) by 0 days.

(21) Appl. No.: 15/634,177

(22) Filed: Jun. 27, 2017

(65) Prior Publication Data

US 2017/0302893 A1 Oct. 19, 2017

Related U.S. Application Data

(60) Division of application No. 15/232,218, filed on Aug. 9, 2016, now Pat. No. 9,690,081, which is a (Continued)

(51) Int. Cl.
*H04N 9/31* (2006.01)
*G03B 21/14* (2006.01)
(Continued)

(52) U.S. Cl.
CPC ............ *H04N 9/31* (2013.01); *G03B 21/147* (2013.01); *G03B 21/60* (2013.01); *G06T 3/005* (2013.01); *G06T 3/0006* (2013.01); *G06T 3/0062* (2013.01); *G06T 15/205* (2013.01); *H04N 9/3102* (2013.01); *G02B 13/06* (2013.01); *G02B 13/08* (2013.01); *G02B 17/08* (2013.01); *G06T 2200/04* (2013.01); *G06T 2200/28* (2013.01); *H04N 1/00267* (2013.01)

(58) Field of Classification Search
CPC .......... H04N 9/12; H04N 9/31; H04N 9/3102; H04N 9/3185; G03B 21/003; G03B 21/006; G03B 21/14; G03B 21/147
See application file for complete search history.

(56) References Cited

U.S. PATENT DOCUMENTS 3,286,590 A  11/1966 Brueggemann
3,420,605 A  1/1969 Kipping
(Continued)

OTHER PUBLICATIONS

Written Opinion and International Search Report, International application No. PCT/US2008/072719, dated Jan. 12, 2009, 7 pages.
(Continued)

*Primary Examiner* — William C Dowling
(74) *Attorney, Agent, or Firm* — Stoel Rives LLP

(57) ABSTRACT

A system for displaying an anamorphic image on a viewing surface comprises a screen having a viewing surface and an image source configured to display the anamorphic image on the viewing surface such that an image viewed on the viewing surface appears undistorted from a viewing point. In addition, the system may also include a reflective lens having a convex exterior surface and a refractive lens having a plurality of surfaces to redirect light toward an image capture device. Further, the system may include an image conversion module for converting a non-anamorphic image into the anamorphic image suitable for displaying on the viewing surface and a selected portion of the anamorphic image into at least one non-anamorphic image.

7 Claims, 21 Drawing Sheets

Related U.S. Application Data continuation of application No. 14/223,720, filed on Mar. 24, 2014, now Pat. No. 9,411,078, which is a division of application No. 12/671,867, filed as application No. PCT/US2008/072719 on Aug. 8, 2008, now Pat. No. 8,678,598.

(60) Provisional application No. 60/954,627, filed on Aug. 8, 2007, provisional application No. 60/954,636, filed on Aug. 8, 2007.

(51) Int. Cl.
    *G06T 3/00* (2006.01)
    *G06T 15/20* (2011.01)
    *G03B 21/60* (2014.01)
    *H04N 1/00* (2006.01)
    *G02B 17/08* (2006.01)
    *G02B 13/06* (2006.01)
    *G02B 13/08* (2006.01)

(56) References Cited

U.S. PATENT DOCUMENTS

| | | |
|---|---|---|
| 4,009,943 A | 3/1977 | Horimoto |
| 5,142,387 A | 8/1992 | Shikama et al. |
| 5,418,584 A | 5/1995 | Larson |
| 5,762,413 A | 6/1998 | Colucci et al. |
| 6,323,858 B1 | 11/2001 | Gilbert et al. |
| 6,341,044 B1 | 1/2002 | Driscoll, Jr. et al. |
| 6,871,958 B2 | 3/2005 | Streid et al. |
| 6,885,509 B2 | 4/2005 | Wallerstein et al. |
| 7,684,127 B2 | 3/2010 | Asami |
| 7,864,435 B2 | 1/2011 | Rodriguez, Jr. et al. |
| 8,643,958 B2 | 2/2014 | Abe et al. |
| 9,176,304 B2 | 11/2015 | Asami et al. |
| 2001/0015751 A1 | 8/2001 | Geng |
| 2004/0104996 A1 | 6/2004 | Hayashi et al. |
| 2006/0028542 A1 | 2/2006 | Rondinelli et al. |
| 2006/0125955 A1* | 6/2006 | Yang .............. G06T 3/4007 348/441 |
| 2017/0270634 A1* | 9/2017 | Eggebrecht .......... G06T 3/0043 |

OTHER PUBLICATIONS

Kostas Daniilidis, Welcome to the Page of Omnidirectional Vision, http://www.cis.upenn.edu/~kostas/omni.html, visited Jul. 29, 2008, 5 pages.

* cited by examiner

SYSTEM FOR GENERATING AN ANAMORPHIC IMAGE FROM A NON-ANAMORPHIC IMAGE

RELATED APPLICATIONS

This application is a division of U.S. patent application Ser. No. 15/232,218, filed Aug. 9, 2016, now U.S. Pat. No. 9,690,081, which is a continuation of U.S. patent application Ser. No. 14/223,720, filed Mar. 24, 2014, now U.S. Pat. No. 9,411,078, which is a division of U.S. patent application Ser. No. 12/671,867, filed Feb. 2, 2010, now U.S. Pat. No. 8,678,598, which is a 371 of International Application No. PCT/US08/72719, filed Aug. 8, 2008, which claims benefit under 35 U.S.C. § 119(e) of U.S. Provisional Patent Application No. 60/954,627, filed Aug. 8, 2007, and U.S. Provisional Patent Application No. 60/954,636, filed Aug. 8, 2007, both of which are hereby incorporated by reference in their entireties.

TECHNICAL FIELD

This disclosure relates to devices and methods for capturing, manipulating, and displaying an image having a wide (e.g., panoramic 360 degree) field of view.

DETAILED DESCRIPTION OF EMBODIMENTS

Figure 1:
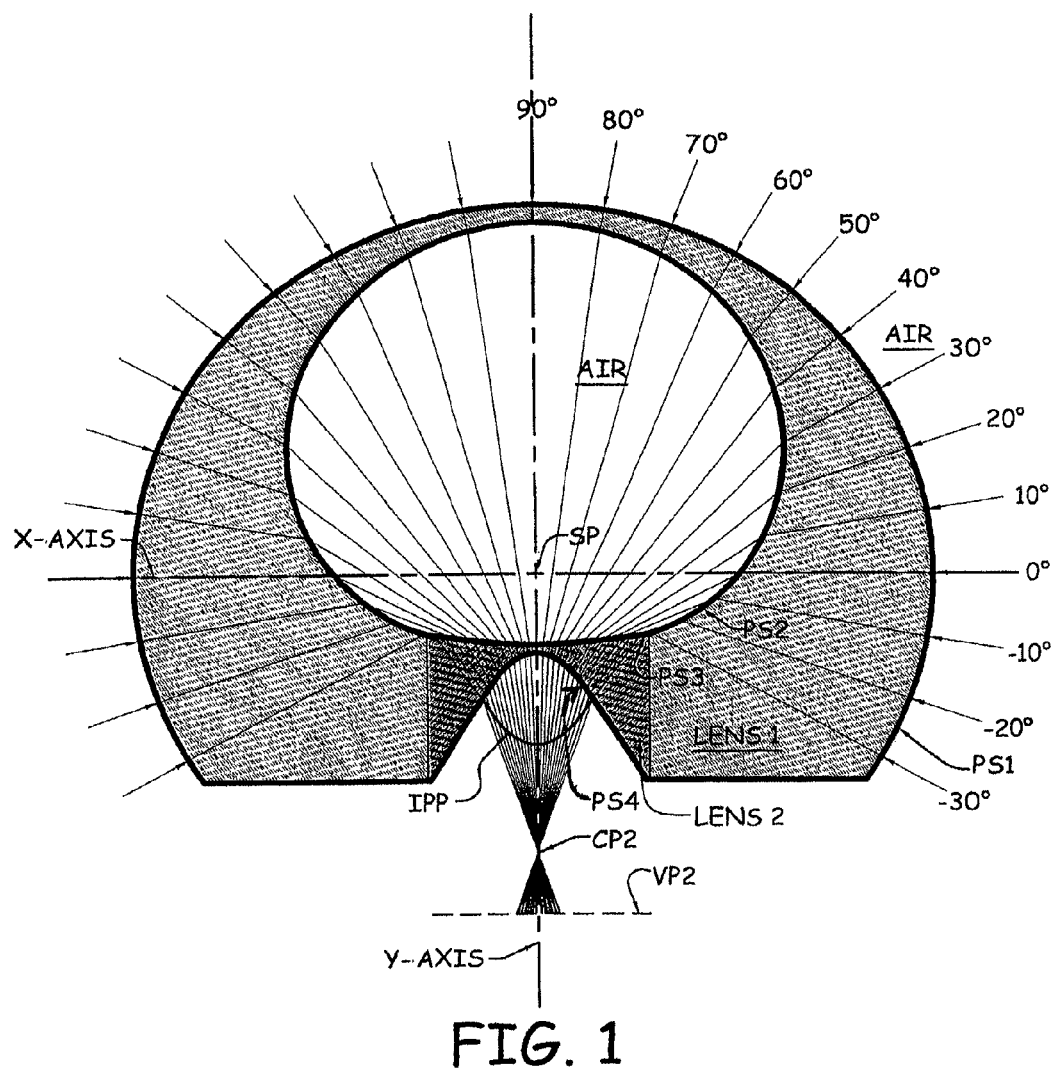
FIG. 1 is a cross-section of a refractive lens according to one embodiment.

With reference to the above-listed drawings, this section describes particular embodiments and their detailed construction and operation. The embodiments described herein are set forth by way of illustration only. In light of the teachings herein, those skilled in the art will recognize that there may be equivalents to what is expressly or inherently taught herein. For example, variations can be made to the embodiments described herein and other embodiments are possible. It is not always practical to exhaustively catalog all possible embodiments and all possible variations of the described embodiments.

For the sake of clarity and conciseness, certain aspects of components or steps of certain embodiments are presented without undue detail where such detail would be apparent to those skilled in the art in light of the teachings herein and/or where such detail would obfuscate an understanding of more pertinent aspects of the embodiments.

As one skilled in the art will appreciate in view of the teachings herein, certain embodiments may be capable of achieving certain advantages, including by way of example and not limitation one or more of the following: (1) providing improved image capture; (2) providing improved display of panoramic images; (3) providing a display that surrounds and immerses a user in an image; (4) providing a lens shaped to capture a panoramic 360 degree field of view; (5) providing a display to view the panoramic 360 degree field of view; (6) generating an undistorted image that has a uniform image density when viewed; (7) providing a projection system that provides a user with an unobstructed view of an image; (8) providing a single camera for image capture; (9) providing a lens having no moving parts; (10) providing an image collection and viewing system that immerses the viewer in the image by providing a horizontal field of view of 360 degrees and vertical field of view approximately 240 degrees measured from the furthest extent of the viewing surface across the azimuth, directly above the viewer, and extending to the opposite furthest extent of the viewing surface; (11) providing an imaging system having a large field of view; (12) providing a lens that can be retrofitted onto a standard camera; (13) capturing images having a large field of view without stitching a combination of images together; and (14) providing a system that accommodates the capture, creation and image manipulation by algorithms and the display of still or motion images. These and other advantages of various embodiments will be apparent upon reading the following.

According to one embodiment, an immersion vision imaging system comprises one or more lenses, viewing surfaces, and algorithms to immerse a viewer in an image—i.e., give the viewer a panoramic field of view of the image spanning up to 360 azimuth degrees and approximately 120 zenith degrees. To capture a wide-angle still or motion image, a camera may be retrofitted with a lens as described in more detail below. In addition, one or more algorithms may be used to convert images captured without using the lenses described below (e.g., an image captured using a traditional camera) or a graphical user interface to a format suitable for viewing on a specially designed screen. The captured and/or converted images can then be projected onto the specially designed screen to immerse the viewer in the image. Images from multiple sources (e.g., an image captured using a camera having a lens as described below and an image converted using one or more of the algorithms described below) can be concurrently displayed on the specially designed screen. Thus, an image of a movie having a traditional aspect ratio, such as Gone with the Wind, can be displayed within an image having a nontraditional aspect ratio, such as an image of the temple of Amen-Ra in Egypt, surrounding the viewer. Additionally, the displayed images can be cropped and converted to a format having a traditional aspect ratio. Thus, a user can select all or a portion of a displayed image and print the image with a traditional printer.

Image Capture

By way of example, traditional cameras have a horizontal field of view of about 40 degrees and a vertical field of view of about 30 degrees. Retrofitting the same camera with one of the lens described below provides a 360 degree horizontal field of view (i.e., 360 azimuth degrees) and an approximately 240 degree vertical field of view (i.e., 120 zenith degrees as measured from the positive z-axis to the furthest extent of the vertical field of view). As used herein, the azimuthal angle, $\theta$, refers to an angle in the xz-plane from the positive y-axis (i.e., the angle between the positive y-axis and a line formed between the origin (the intersection of the x-axis, y-axis, and z-axis) and a projection of a three-dimensional point onto the xz-plane) and the polar angle, expressed in zenith degrees $\phi$, refers to the angle between the positive x-axis and a line formed between the origin and the three-dimensional point. The azimuthal angle is typically within the range of $0 \leq \theta \leq 2\pi$ radians ($0° \leq \theta \leq 360°$) and the polar angle is typically within the range of $0 \leq \phi \leq \pi$ radians ($0° \leq \theta \leq 180°$). The lens may be refractive or reflective, each of which will be described in more detail with reference to FIGS. 1 through 6 and FIGS. 7 through 9, respectively.

Refractive Lenses

Referring now to FIG. 1, a cross-sectional view of a refractive lens is provided. According to one embodiment, the non-spherical refractive lens has a hollow interior. The lens may be constructed from two parts (e.g., lens 1 and lens 2), such as glass or plastic, which may be the same or different materials. The two-piece construction aids in the construction of the lens. For example, lens 1 can be formed by injecting an optically clear medium, such as glass or plastic, into a void between interior and exterior forms and lens 2 can be formed in a similar manner without the use of the interior form. In addition, the non-spherical refractive lens may be constructed in other ways, such as layer-by-layer using stereolithography, or a similar process. The overall dimensions of the lens varies based on the application.

All light headed to a station point SP enters a outermost surface of the lens. The light heading towards the station point SP refracts through subsequent lenses to converge at a camera point CP2. As the light rays travel to a camera point CP2, they pass through an imaginary picture plane IPP having a curved surface. In one embodiment, the imaginary picture plane IPP defines a shape referred to herein as a "Harris" shape. For example, if an impulse of light is directed toward lens 1 at time t=0, the imaginary picture plane IPP defines the location of light rays originally heading toward the station point SP at some later point in time, t>0, after having traveled though lenses 1 and 2. In other words, as shown in FIG. 1 the light ray represented by the arrow −30 degrees below the x-axis travels through more of the medium of lenses 1 and 2 than the light ray represented by the arrow 90 degrees above the x-axis. Because the speed of light is slower when traveling through lenses 1 and 2 (e.g., light travels through glass slower than light traveling through a vacuum—approximately 0.6667c) as compared to air (e.g., light travels through air slightly slower than light traveling through a vacuum—approximately 0.9997c), it will take longer for the light impulse traveling along light ray −30 to reach the imaginary picture plane IPP than the light impulse traveling along light ray 90.

A two dimensional flat image may be captured by an image capture device as the light rays converge on a focal plane or viewing plane VP2. According to one embodiment, the viewing plane VP2 is orthogonal to the y-axis. As shown, the viewing plane VP2 is located such that the camera point CP2 is between the station point SP and the viewing plane VP2. Thus, the image captured at the viewing plane VP2 is inverted (similar to the image captured using the reflective lens described with reference to FIGS. 7 through 9, except without capturing the camera and camera support). If the viewing plane VP2 is located between the camera point CP2 and the station point SP, the image would not be inverted.

The image capture device may comprise photographic film, film stock, a device capable of converting electromagnetic waves into an electrical signal (e.g., a camera having a CMOS or CCD imager), or another device capable of capturing an optical image, and may be configured to capture still or moving images. The resolution of the image capture device varies based on the application. For example, in order to capture and display an image having the same image density as a traditional 1680×1200 pixel computer screen at an eighteen inch distance, the resolution of the image capture device would increase approximately by a factor of twenty-five, or from approximately two megapixels to approximately fifty megapixels. Thus, if this ratio holds true for digital photographic images, a standard ten megapixel photograph may require an image capture device having a 250 megapixel resolution to capture and display an image having the same image density.

FIG. 1 illustrates light rays traveling to the viewer or the station point SP and are depicted by arrows distributed in 10 degree increments from –30 degrees to 90 degrees about the station point SP. As the light rays enter the refractive surface PS1 of the lens 1 they do not refract because the surface PS1 is normal, or 90 degrees, to the station point SP. As the light rays exit the refractive surface PS2 of the lens 1 they bend in the direction of the camera point CP2. As the light rays enter the refractive surface PS3 of the lens 2 they bend further in the direction of the camera point CP2. Finally, as the light rays exit the refractive surface PS4 of the lens 2 they bend again and converge on the camera point CP2.

According to one embodiment, the outside surface PS1 defines a portion of a sphere of refractive material, such as glass, having its center at the station point SP. Using a semispherical surface for the surface PS1 helps ensure that there is no refraction of the light heading toward the center point as it enters the surface PS1. The three other surfaces PS2, PS3, and PS4 each play a role in refracting the light rays and shifting the focal point so that the final focal point is coincident with the camera point CP2. Thus, the surface PS1 need not be semispherical if one or more of the other surfaces PS2, PS3, and PS4 is adjusted to compensate for the difference. For example, if the surface PS1 is slightly adjusted to shift the focal point from the station point SP to another point (perhaps closer to CP2), one or more of the other surfaces PS2, PS3, and PS4 could be changed to ensure the final focal point is coincident with the camera point CP2.

Figure 2:
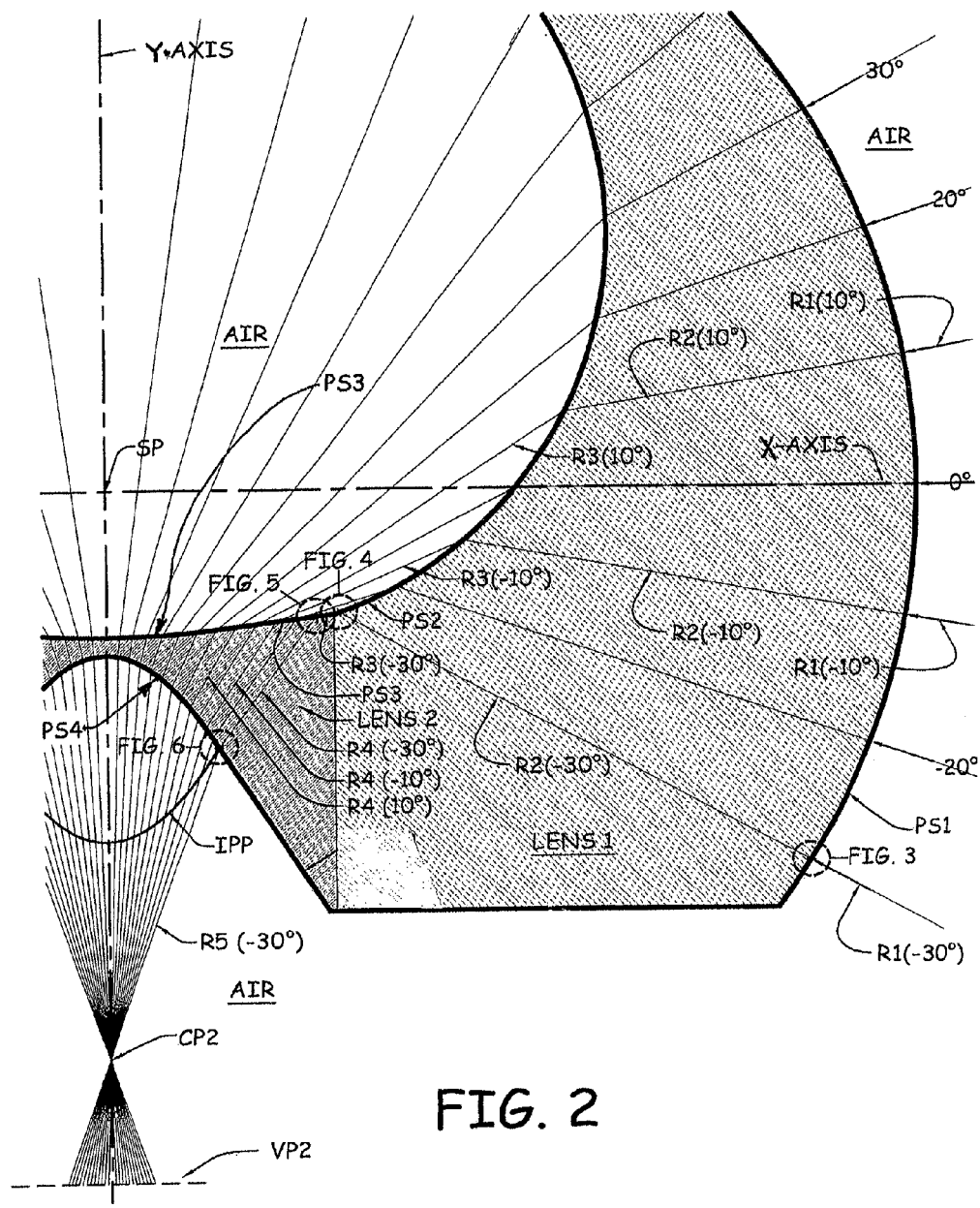
FIG. 2 is an enlarged cross-section of the refractive lens of FIG. 1.

Referring now to FIG. 2, the light rays that were originally headed toward the station point SP are shown refracting through the various lens surfaces to result in the light rays converging on the camera point CP2. The ray segments R1 through R5 (hereafter referred to as simply "rays" for ease of reference) refer to each individual segment of the light ray as it travels through different media, and the degrees indicates the degrees from the x-axis about the station point SP. For example, the rays R1 are those light ray segments that are initially headed to the station point SP and encounter the surface PS1. The rays R2 are those light ray segments that have entered the optical media of the lens 1 through the surface PS1 but have not exited the lens 1 through the surface PS2. The rays R3 are those light ray segments that have exited the surface PS2 but have not yet entered the surface PS3 of lens 2. The rays R4 are those light ray segments that have entered the optical media of the lens 2 but have not exited the lens 2 through the surface PS4. The rays R5 are those light ray segments that have exited the surface PS4 and are traveling to the camera point CP2. As shown in FIG. 2, the portion of lens 2 between the intersection of ray segments R4(-30) and R5(-30) extends in a straight line to the bottommost portion of lens 1. However, the portion of lens 2 between the intersection of ray segments R4(-30) and R5(-30) may take another shape, such as extending downward parallel to the y-axis.

Figure 3:
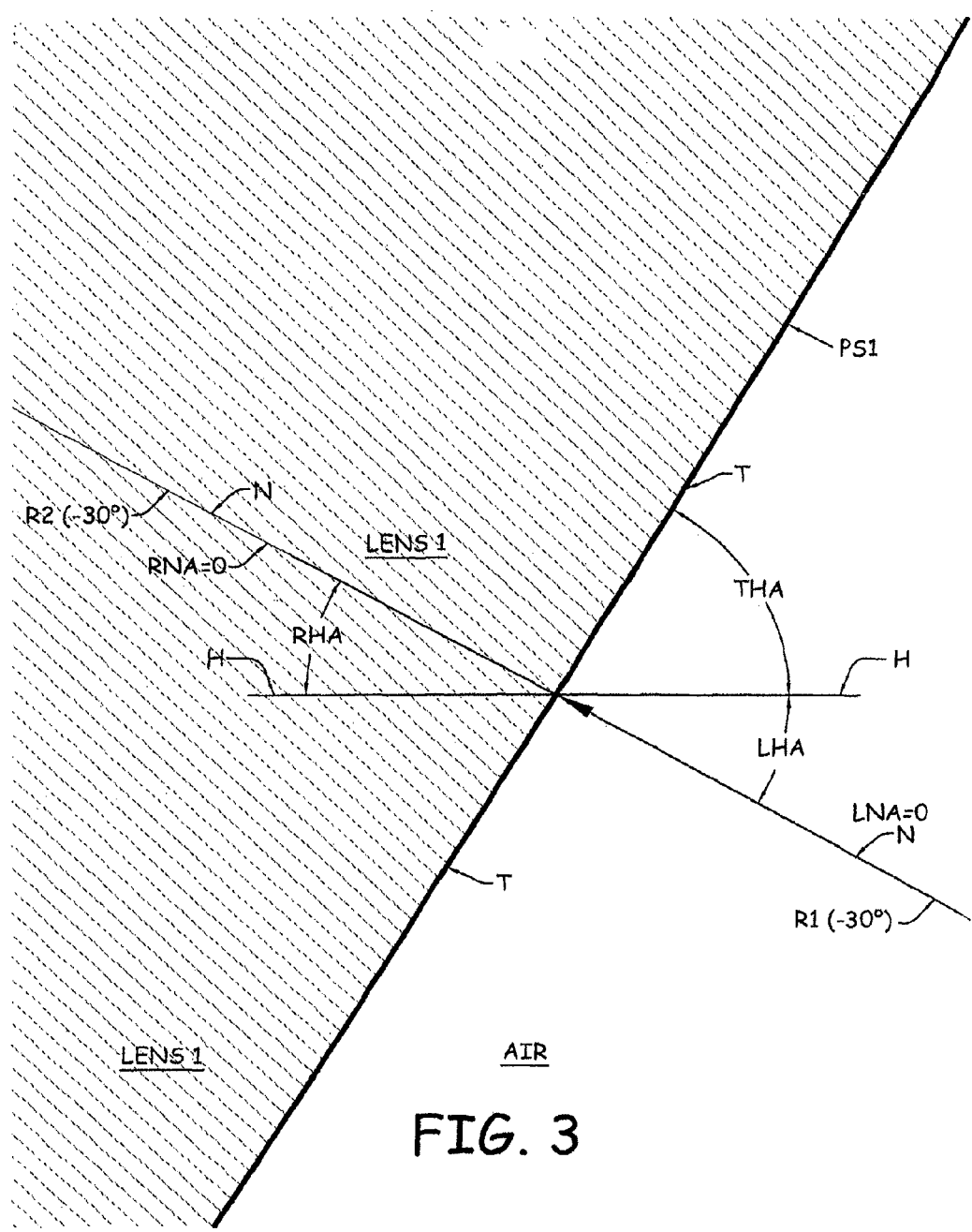
FIG. 3 is an enlarged cross-section of the refractive lens of FIG. 2 illustrating a ray intersecting an outer surface of the refractive lens at a 90 degree angle of incidence.

FIG. 3 is an enlarged cross-section of the lens of FIG. 2 showing the ray segment R1 intersecting the surface PS1 at a right angle. The ray segment R1(-30) is headed to the station point SP at 30 degrees below where the x-axis intersects with the surface PS1. The ray segment R1(-30) illustrates a light ray, in the air, prior to intersecting the surface PS1. The ray segment R2(-30) illustrates the light ray, in lens 1, after it intersects the surface PS1. The refraction of ray segment R1(-30) as it passes from one media, such as air having a refractive index of $n_1=1.0$, to a different media, such as glass or a polycarbonate having a refractive index $n_2=1.51$, can be determined from Equation 1 (Snell's law), where LNA is the angle of incidence measured from the normal line N and RNA is the angle of refraction measured from the normal line N.

$$n_1 * \sin(\text{LNA}) = n_2 * \sin(\text{RNA}) \quad \text{Equation 1}$$

According to one embodiment, the surface PS1 of lens 1 is semispherical about the station point SP. Thus, the ray segment R1(-30) is parallel to the normal line N (e.g., LNA=0), and there is no refraction as the ray segment R1(-30) intersects the surface PS1 (e.g., RNA=0). As shown in FIG. 3, the horizontal line H is parallel to the x-axis (FIG. 1). Thus, the angle LHA between the ray segment R1(-30) and the horizontal line H equals 30 degrees (e.g., 30 degrees below the horizontal line H).

Figure 4:
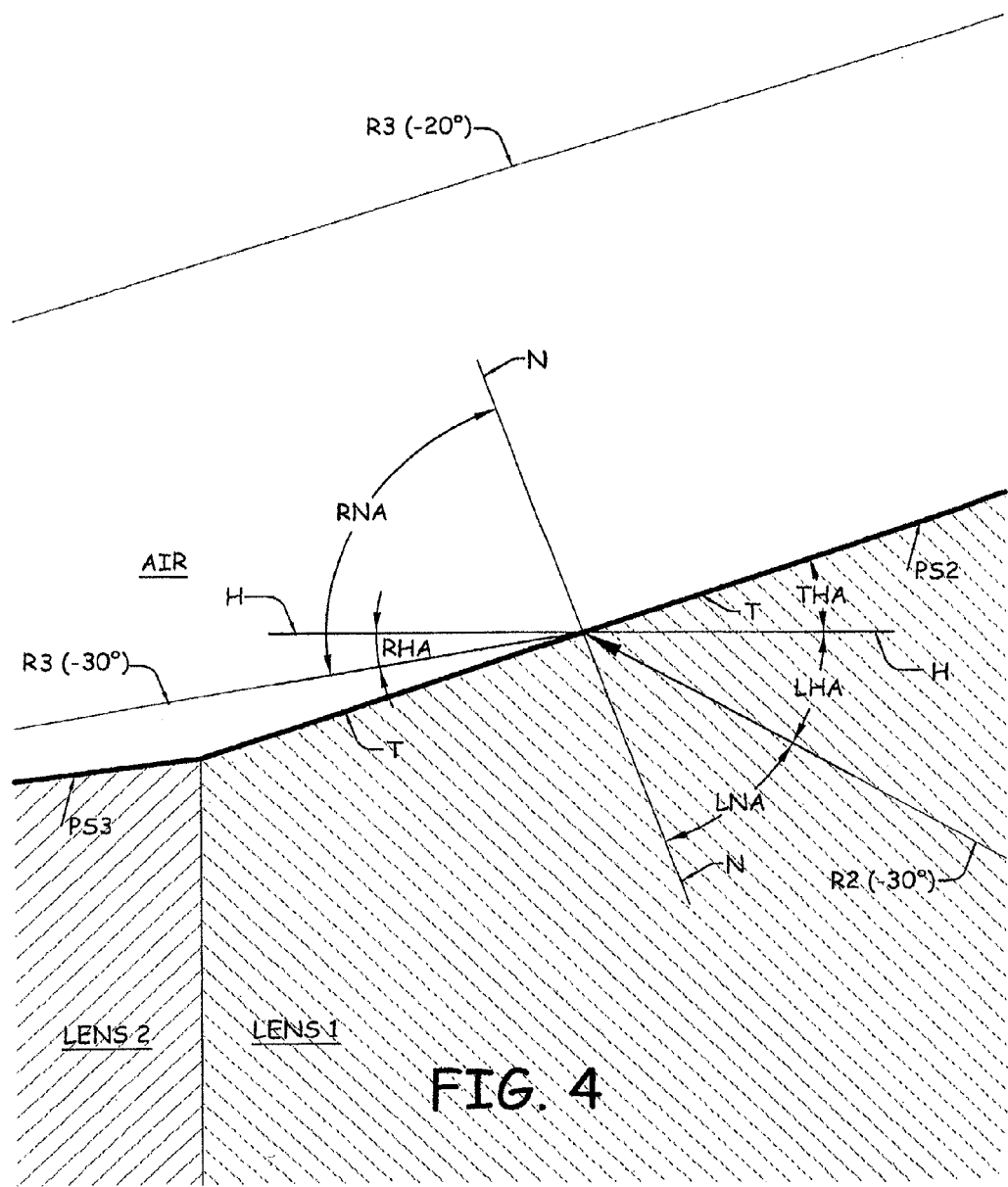
FIG. 4 is an enlarged cross-section of the refractive lens of FIG. 2 illustrating the refraction of the ray of FIG. 3 as it travels from the lens media (e.g., glass) to an internal media (e.g., air).

FIG. 4 is an enlarged cross-section of the lens of FIG. 2 showing the ray segment R2(-30) intersecting the surface PS2. As previously discussed, the ray segment R2(-30) indicates a ray of light traveling inside of the lens 1 prior to intersecting the surface PS2. The ray segment R3(-30) designates the ray of light in the air after the intersection at the surface PS2. The normal line N is perpendicular to the surface PS2. The tangent line T is tangent to the surface PS2 at point PS2(-30) (e.g., the intersection of the ray segments R2(-30) and R3(-30)). The refraction of ray segment R2(-30) as it passes from one media, such as glass or a polycarbonate having a refractive index $n_1=1.51$, to a different media, such as air having a refractive index of $n_2=1.0$, can be determined from Equation 1 above, where LNA is the angle of incidence measured from the normal line N and RNA is the angle of refraction measured from the normal line N. An angle LHA is the angle between the ray segment R2(-30) to the horizontal line H. An angle THA is the angle between the tangent line T to the horizontal line H. An angle RHA is the angle between the ray segment R3(-30) to the horizontal line H.

Figure 5:
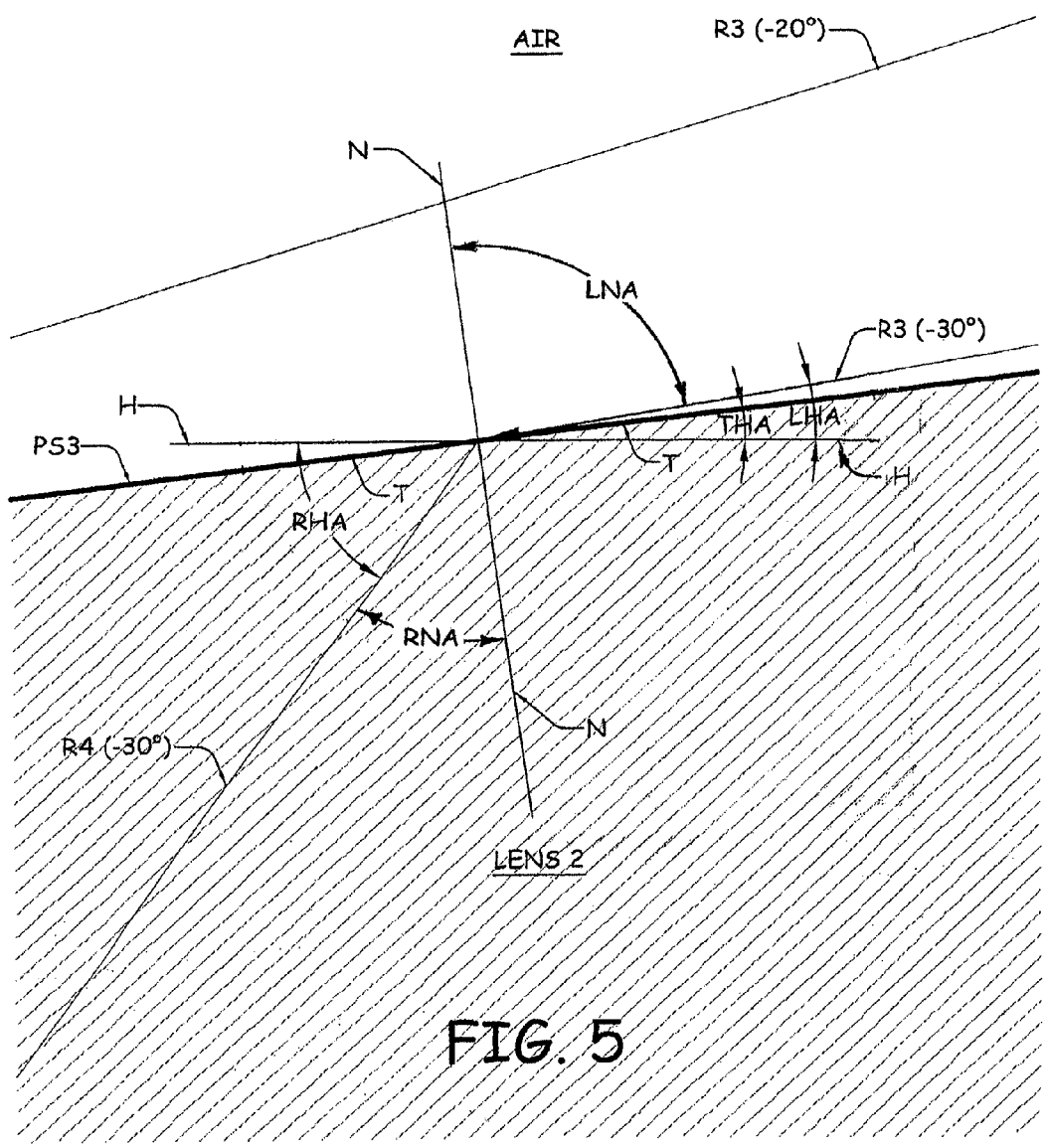
FIG. 5 is an enlarged cross-section of the refractive lens of FIG. 2 illustrating the refraction of the ray of FIG. 4 as it travels from the internal media to the lens media.

FIG. 5 is an enlarged cross-section of the lens of FIG. 2 showing the ray segment R3(-30) intersecting the surface PS3. The ray segment R3(-30) indicates a ray of light, in the air, prior to intersection of the surface PS3 and the ray segment R4(-30) designates the ray of light, in the lens 2, after the intersection at the surface PS3. The normal line N is perpendicular to the surface PS3. The tangent line T is tangent to the surface PS3 at point PS3(-30) (e.g., the intersection of the ray segments R3(-30) and R4(-30)). The refraction of ray segment R3(-30) as it passes from one media, such as air having a refractive index of $n_1=1.0$, to a different media, such as glass or a polycarbonate having a refractive index $n_2=1.51$, can be determined from Equation 1, where LNA is the angle of incidence measured from the normal line N and RNA is the angle of refraction measured from the normal line N. The angle from the ray segment R3(-30) to the horizontal line H is angle LHA. The angle from the ray segment R4(-30) to the horizontal line H is angle RHA. The angle from the tangent line T to the horizontal line H is angle THA.

Figure 6A:
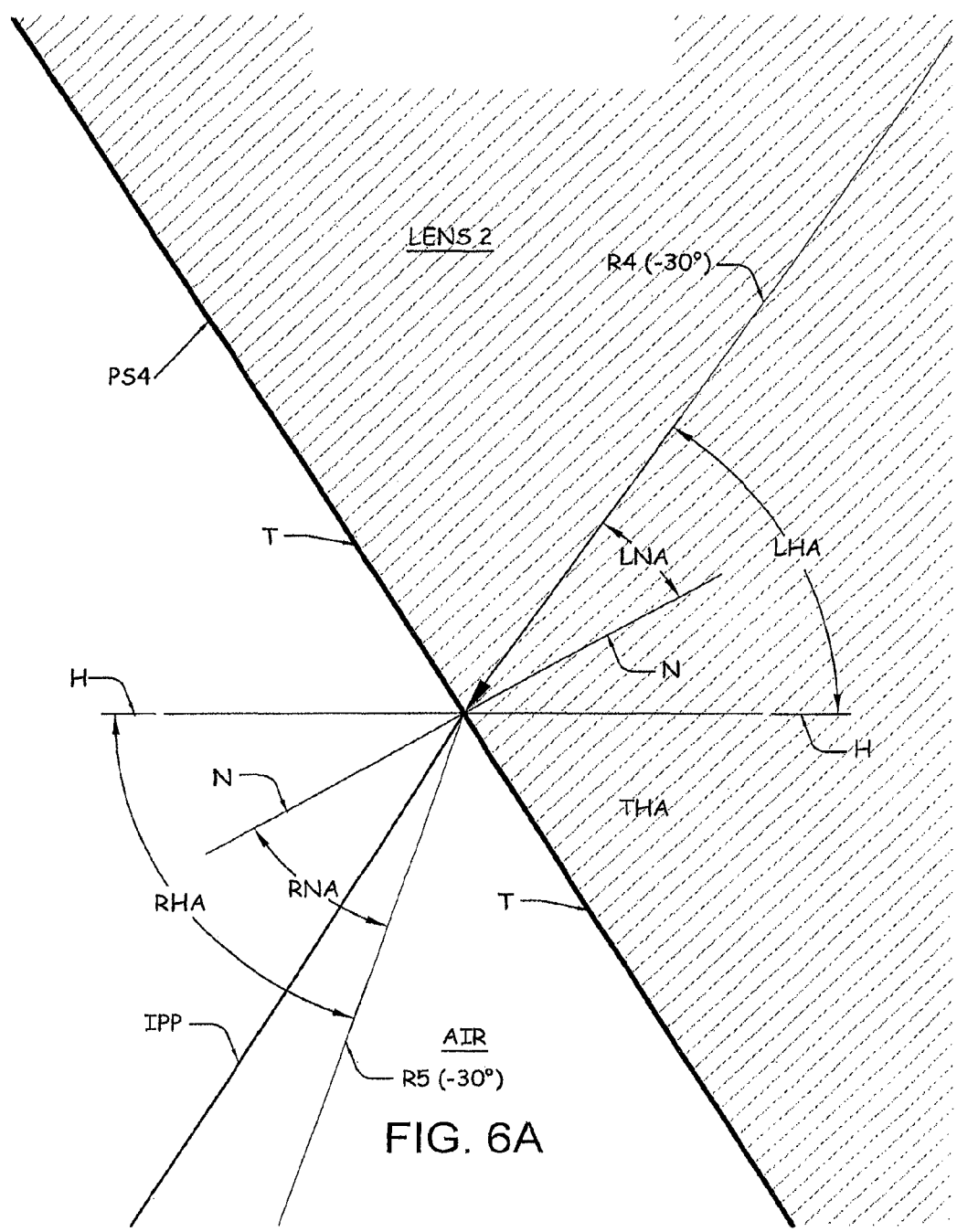
FIG. 6A is an enlarged cross-section of the refractive lens of FIG. 2 illustrating the refraction of the ray of FIG. 5 as it travels from the lens media to an external media (e.g., air).
Figure 6B:
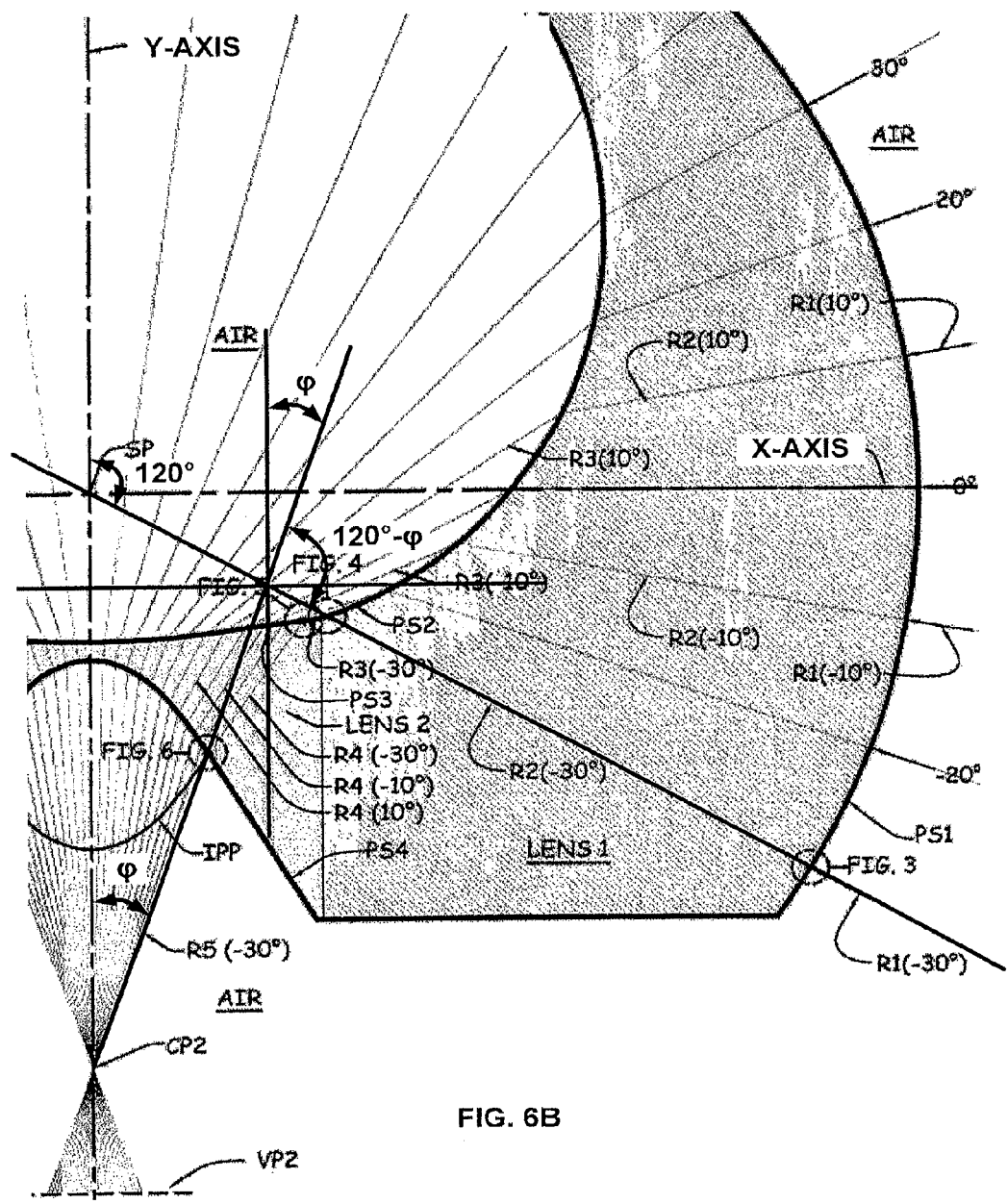
FIG. 6B illustrates the extent to which a ray segment refracts after passing through the refractive lens of FIG. 2.

FIG. 6A is an enlarged cross-section of the lens of FIG. 2 showing the ray segment R4(-30) intersecting the surface PS4. The ray segment R4(-30) indicates a ray of light in the lens 2, prior to intersection of the surface PS4 and the ray segment R5(-30) designates the ray of light in the air after the intersection at the surface PS4. The normal line N is perpendicular to the surface PS4. The tangent line T is tangent to the surface PS4 at point PS4(-30) (e.g., the intersection of the ray segments R4(-30) and R5(-30)). The refraction of ray segment R4(-30) as it passes from one media, such as glass or a polycarbonate having a refractive index $n_1=1.51$, to a different media, such as air having a refractive index of $n_2=1.0$, can be determined from Equation 1 above, where LNA is the angle of incidence measured from the normal line N and RNA is the angle of refraction measured from the normal line N. The angle from the ray segment R4(-30) to the horizontal line H is LHA. The angle from the ray segment R5(-30) to the horizontal line H is RHA. The angle from the tangent line T to the horizontal line H is THA. The angle from the ray segment R4(-30) to the horizontal line H is RHA.

Thus, as illustrated in FIGS. 1 through 6A, the ray of light at the edge of the field of view (e.g., the ray segment R1(-30)), travels through the four refractive interfaces of the lenses 1 and 2. FIG. 6B illustrates the extent to which the ray segment R1(-30) refracts after passing through the lenses 1 and 2 and emerges as ray segment R5(-30). The angle between the y-axis and the ray segment R1(-30) is approximately one-half of the field of view measured from station point SP, or 120 degrees in the embodiment illustrated in FIG. 6B. The angle between the y-axis and the ray segment R5(-30) is ϕ degrees measured from the camera point CP2. Thus, the ray segment R1(-30) refracts a total of one-half of the field of view minus ϕ, or 120 degrees minus ϕ degrees in the embodiment illustrated in FIG. 6B. While there may be additional or fewer refraction interfaces, the light ray at the edge of the field of view still refracts a total of one-half of the field of view minus ϕ (e.g., 120 degrees minus ϕ degrees) measured from the station point SP as the ray passes through the multiple refractive interfaces.

Figure 9:
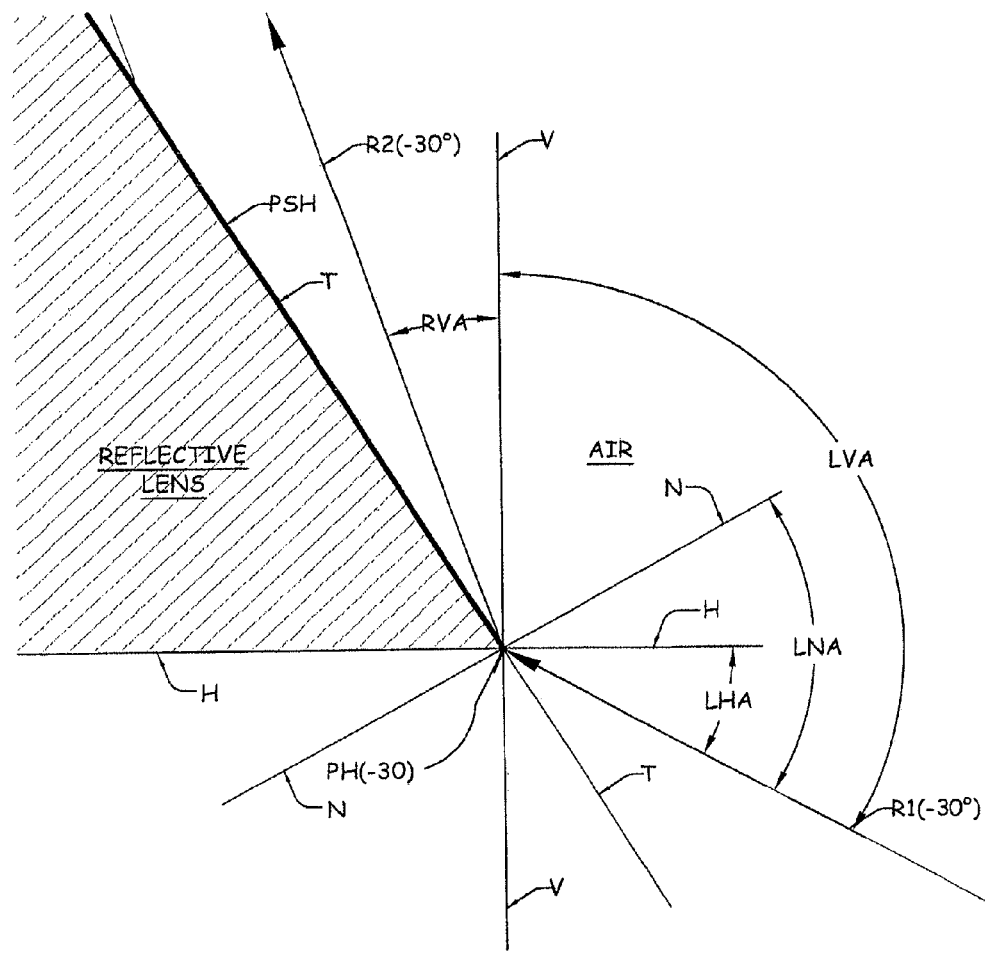
FIG. 9 is an enlarged cross-section of the reflective lens of FIG. 7 illustrating a ray reflecting off an outer surface of the reflective lens.

According to one embodiment, points on the surfaces PS1, PS2, PS3, and PS4 can be determined by first establishing the path of a light ray at the edge of the field of view as it passes through lenses 1 and 2 and converges at the camera point CP2, and then by establishing the paths of the other light rays within the field of view emanating outward from the camera point CP2. The ray segment R1(-30) passing through the lens 1 and 2 at the edge of the field of view is chosen because it has the largest change of direction of any of the light rays entering into the lens 1 originally headed to the station point SP and refracted to the camera point CP2. The light ray traveling along the ray segments R1(-30) through R5(-30) enters and exits the various refractive interfaces and ultimately arrives at the camera point CP2. According to one embodiment, the angle ϕ between the y-axis and the ray segment R5(-30) measured from the camera point CP2 (FIG. 6B) is identical to the angle RVA between the vertical line V and ray segment R2(-30) measured from the point PH(-30) on the reflective lens (FIG. 9). According to one embodiment, the angle of total internal refraction is not exceeded for each of the refractive surfaces of the lenses.

An example of determining points on the surfaces PS1, PS2, PS3, and PS4 will be provided with reference to FIG. 1. First, points on the surfaces PS1, PS2, PS3, and PS4 can determined at the edge of the field of view by tracing the ray segment R1(-30) as it travels through the refractive media and emerges as ray segment R5(-30) headed to camera point CP2. The example assumes that the station point SP is coincident the origin of the coordinate system (e.g., (X,Y,Z)=(0,0,0)), the camera point CP1 has coordinates (0, 7.2679,0), point e has coordinates (3,-1.7321,0), base point BP has coordinates (0,-1.7321,0), D is equal to 120 degrees, $\Delta F_{RVA}$ is equal to 1 degree, $RVA_e$ is equal to 18.4350 degrees, n1 for air equals 1.00029 and n2 equals 1.52 for the refractive lens media.

As illustrated in FIG. 3, there is no refraction when the ray segment R1(-30) enters the surface PS1 because the light ray is normal to the surface (e.g., the angle LNA is zero degrees). In this example the intersection of the ray segment R1(-30) and the surface PS1 has coordinates (9.1812,-5.3007,0). The ray segment R1(-30) enters the surface of PS1 at -30° from the x-axis (e.g., LHA=-30°) and exits the surface PS1 at 30° from the x-axis (e.g., RHA=30°).

As illustrated in FIG. 4, as the ray segment R2(-30) passes through the surface PS2 and emerges as ray segment R3(-30), it refracts away from the normal line of the lens surface PS2. In this example the intersection of ray segment R2(-30) and the surface PS2 occurs at point e having coordinates (3.0000,-1.7321,0). The ray segment R2(-30) approaches the surface PS2 at -30° from the x-axis (e.g., LHA=-30°) and the angle LNA equals 40.49°. The angle RNA can be determined by substituting the known values into Equation 1 (Snell's Law) and solving for RNA. Thus, the angle RNA equals 80.64° (1.52*sin(40.49°)=1.00029*sin(RNA)). The ray segment R3(-30) is leaving the surface PS2 at 10.15° degrees below the x-axis (e.g., RHA=-10.15°).

As illustrated in FIG. 5, as the ray segment R3(-30) passes through the surface PS3 and emerges as ray segment R4(-30), it refracts away from the normal line of the lens surface PS3. In this example the intersection of ray segment R3(-30) and surface PS3 occurs at point having coordinates (2.7051,-1.7849,0). The ray segment R3(-30) approaches the surface PS3 of the lens 2 at 10.15° from the x-axis (e.g., LHA=10.15°) and the angle LNA equals 87.06°. Substituting the known values into Equation 1 and solving for RNA yields 41.09° (1.00029*sin(87.06)=1.52*sin(RNA)). The resulting ray segment R4(-30) exiting the surface PS3 and heading towards the surface PS4 is 56.12° below the x-axis (e.g., RHA=-56.12°).

As illustrated in FIG. 6A, as the ray segment R4(-30) passes through the surface PS4 and emerges as ray segment R5(-30), it refracts away from the normal line of the lens surface PS4. In this example the intersection of ray segment R4(-30) and PS4 occurs at a point having coordinates (1.4674,-3.6280,0). The ray segment R4(-30) approaches the surface PS4 at 56.12° from the x-axis (e.g., LHA=56.12°) and the angle LNA equals 25.61°. Substituting the known values into Equation 1 and solving for RNA yields 41.05° 1.52*sin(56.12)=1.00029*sin(RNA). The resulting ray segment R5(-30) exits the surface PS4 at 71.57° degrees below the x-axis (e.g., RHA=-71.57°). The angle $RVA_e$=RHA-90°=18.436°. With reference to FIG. 2, the intersection of the ray segment R5(-30) with the y-axis (e.g., the camera point CP2) can be determined to have coordinates (0,-8.0302,0) using geometry.

After having established the location of the camera point CP2 and knowing that the angle $RVA_e$ is fixed and D equals 120, the shapes of the surfaces PS1, PS2, PS3 and PS4 can be determined according to this example by extending 120 ray segments R5 outwardly from the camera point CP2 such that the ray segments R5 are equally spaced between the edges of the field of view. The number of light rays used to calculate points on the surfaces can determine the level of precession for the refractive lens surfaces. In this example there is one light ray traced for every 1 degree of the field of view about the station point SP, or D=120 for one half of the field of view.

In this example, the surface PS4 takes the Harris shape (see, e.g., Equation 22). Point e is located at the edge of the field of view on the surface PS2 and was previously calculated to have coordinates (3,-1.7321,0). Because shape of the surface PS4 is known and the angular directions of all of the ray segments R5 are known, the direction of the ray segments R4 can be determined using Equation 1 as previously described.

The surface of PS3 is initially roughly determined as an arc located between the surface PS4 and the station point SP.

The rough determination of the surface PS4 can be accomplished by extending an arc from the point of intersection of the ray segment R4(-30) and the surface PS3 (previously calculated) to the y-axis. The origin of the arc is approximately at the intersection of the surface PS1 and the y-axis. The rough or approximate surface of PS3 is divided into equal segments corresponding to the number of light rays analyzed within the field of view (e.g., 120 in this example). Having determined the approximate surface of PS3 and knowing the direction of the ray segments R4, the paths of all the ray segments R3 approaching the surface PS3 can be determined using Equation 1.

In this example the point e on the surface PS2 was previously determined to have coordinates (3,-1.7321,0). Because the normal line to the surface at point e was previously determined with respect to FIG. 4, the tangent line, which is perpendicular to the normal line, can be determined. By extending the tangent line of the surface at point e to intersect with the ray segment R3(-29), the surface PS2 can be defined using Equation 1 as a surface required to refract the ray segment R3(-29) to intersect the previously defined location of the intersection of the ray segment R4(-29) and the surface PS3. Next, by extending the tangent line from the surface at the previously defined point of intersection of the ray segment R4(-30) and the surface PS3 to intersect with the ray segment R4(-29) a final location of the surface PS3 at the intersection of the ray segment R4(-29) can be determined.

Next, the tangent line of the surface PS2 at the intersection with the ray segment R2(-29) is extended to intersect with the ray rays segment R3(-28), and the surface PS2 is defined using Equation 1 as the surface required to refract the ray segment R3(-28) to intersect with the previously defined location of the intersection of ray segment R4(-28) and the surface PS3. Next, by extending the tangent line from the surface PS2 at the previously defined point of intersection of the ray segment R4(-29) and the surface PS3 to intersect with the ray segment R4(-28), the final location of the surface PS3 at the intersection of the ray segment R4(-28) is determined. This process of defining points on the surface PS3 is reiterated for the light rays R3(-28), R3(-27), and so forth until ray segment R3(0) is reached and the points on the surfaces PS3 and PS2 are known all the way to the y-axis.

Table 1 below contains four sets of 121 points on the right had side of the y-axis that lie on the example surfaces PS1, PS2, PS3, and PS4 shown in FIGS. 1 through 6B. Because the lenses 1 and 2 are symmetrical about the y-axis, the set of points can be rotated around the y-axis to determine other points that lie on the example surfaces PS1, PS2, PS3, and PS4. The data Table 1 can represent data having any unit and can be scaled to any desired overall size.

TABLE 1

| Point | Surface PS1 (x,y) | Surface PS2 (x,y) | Surface PS3 (x,y) | Surface PS4 (x,y) |
|---|---|---|---|---|
| 1 | (9.181152,-5.300741) | (3.000000,-1.732051) | (0.000000,-2.053583) | (0.000000,-2.307255) |
| 2 | (9.272265,-5.139700) | (3.076601,-1.705207) | (0.017777,-2.053577) | (0.016346,-2.307489) |
| 3 | (9.360553,-4.977094) | (3.153488,-1.676535) | (0.035537,-2.053563) | (0.031245,-2.307918) |
| 4 | (9.445989,-4.812972) | (3.231123,-1.646176) | (0.053255,-2.053527) | (0.046862,-2.308645) |
| 5 | (9.528548,-4.647384) | (3.309360,-1.613921) | (0.070981,-2.053470) | (0.062475,-2.309372) |
| 6 | (9.608205,-4.480380) | (3.388147,-1.579764) | (0.088727,-2.053390) | (0.078085,-2.310099) |
| 7 | (9.684935,-4.312011) | (3.467431,-1.543650) | (0.106500,-2.053289) | (0.093663,-2.312568) |
| 8 | (9.758715,-4.142329) | (3.547162,-1.505535) | (0.124299,-2.053164) | (0.109239,-2.314454) |
| 9 | (9.829522,-3.971385) | (3.627286,-1.465377) | (0.142134,-2.053017) | (0.124799,-2.316629) |
| 10 | (9.897336,-3.799231) | (3.707753,-1.423136) | (0.160010,-2.052846) | (0.140341,-2.319091) |
| 11 | (9.962134,-3.625920) | (3.788506,-1.378763) | (0.177929,-2.052651) | (0.155863,-2.321840) |
| 12 | (10.023898,-3.451505) | (3.869506,-1.332247) | (0.195898,-2.052431) | (0.171363,-2.324875) |
| 13 | (10.082608,-3.276038) | (3.950682,-1.283526) | (0.213921,-2.052187) | (0.186837,-2.328194) |
| 14 | (10.138247,-3.099573) | (4.031975,-1.232573) | (0.232002,-2.051916) | (0.202285,-2.331796) |
| 15 | (10.190798,-2.922164) | (4.113324,-1.179355) | (0.250148,-2.051620) | (0.217704,-2.335680) |
| 16 | (10.240245,-2.743865) | (4.194666,-1.123838) | (0.268359,-2.051296) | (0.233092,-2.339845) |
| 17 | (10.286572,-2.564730) | (4.275938,-1.065995) | (0.286644,-2.050944) | (0.248446,-2.344289) |
| 18 | (10.329766,-2.384814) | (4.357071,-1.005796) | (0.305004,-2.050564) | (0.263765,-2.349009) |
| 19 | (10.369814,-2.204172) | (4.437999,-0.943216) | (0.323446,-2.050154) | (0.279047,-2.354005) |
| 20 | (10.406702,-2.022858) | (4.518653,-0.878231) | (0.341972,-2.049713) | (0.294289,-2.359274) |
| 21 | (10.440421,-1.840928) | (4.598956,-0.810817) | (0.360586,-2.049240) | (0.309490,-2.364815) |
| 22 | (10.470960,-1.658437) | (4.678836,-0.740954) | (0.379294,-2.048734) | (0.324647,-2.370624) |
| 23 | (10.498309,-1.475441) | (4.758219,-0.668627) | (0.398097,-2.048194) | (0.339758,-2.376700) |
| 24 | (10.522460,-1.291996) | (4.837026,-0.593818) | (0.417002,-2.047620) | (0.354823,-2.383041) |
| 25 | (10.543405,-1.108157) | (4.915179,-0.516516) | (0.436009,-2.047009) | (0.369838,-2.389643) |
| 26 | (10.561140,-0.923980) | (4.992597,-0.436709) | (0.455123,-2.046360) | (0.384801,-2.396504) |
| 27 | (10.575657,-0.739522) | (5.069198,-0.354389) | (0.474347,-2.045673) | (0.399712,-2.403621) |
| 28 | (10.586952,-0.554839) | (5.144896,-0.269551) | (0.493685,-2.044945) | (0.414568,-2.410991) |
| 29 | (10.595023,-0.369986) | (5.219613,-0.182196) | (0.513138,-2.044176) | (0.429367,-2.418611) |
| 30 | (10.599867,-0.185021) | (5.293258,-0.092320) | (0.532710,-2.043364) | (0.444109,-2.426477) |
| 31 | (10.601481, 0.000000) | (5.365745,0.000070) | (0.552402,-2.042507) | (0.458790,-2.434587) |
| 32 | (10.599867, 0.185021) | (5.436987,0.094970) | (0.572219,-2.041605) | (0.473410,-2.442937) |
| 33 | (10.595023, 0.369986) | (5.506895,0.192369) | (0.592161,-2.040656) | (0.487967,-2.451523) |
| 34 | (10.586952, 0.554839) | (5.575380,0.292253) | (0.612231,-2.039659) | (0.502459,-2.460342) |
| 35 | (10.575657, 0.739522) | (5.642351,0.394608) | (0.632430,-2.038611) | (0.516886,-2.469389) |
| 36 | (10.561140, 0.923980) | (5.707718,0.499414) | (0.652373,-2.037490) | (0.531245,-2.478661) |
| 37 | (10.543405, 1.108157) | (5.771390,0.606647) | (0.672844,-2.036295) | (0.545535,-2.488154) |
| 38 | (10.522460, 1.291996) | (5.833276,0.716282) | (0.693451,-2.035046) | (0.559755,-2.497863) |
| 39 | (10.498309, 1.475441) | (5.893285,0.828289) | (0.714191,-2.033744) | (0.573904,-2.507785) |
| 40 | (10.470960, 1.658437) | (5.951326,0.942636) | (0.735069,-2.032385) | (0.587980,-2.517914) |
| 41 | (10.440421, 1.840928) | (6.007308,1.059285) | (0.756082,-2.030970) | (0.601983,-2.528247) |
| 42 | (10.406702, 2.022858) | (6.061141,1.178198) | (0.777233,-2.029497) | (0.615911,-2.538779) |
| 43 | (10.369814, 2.204172) | (6.112735,1.299329) | (0.798521,-2.027964) | (0.629763,-2.549505) |
| 44 | (10.329766, 2.384814) | (6.162000,1.422634) | (0.819946,-2.026372) | (0.643538,-2.560420) |

TABLE 1-continued

| Point | Surface PS1 (x,y) | Surface PS2 (x,y) | Surface PS3 (x,y) | Surface PS4 (x,y) |
| --- | --- | --- | --- | --- |
| 45 | (10.286572, 2.564730) | (6.208847,1.548060) | (0.841508,−2.024719) | (0.657236,−2.571521) |
| 46 | (10.240245, 2.743865) | (6.253191,1.675554) | (0.863207,−2.023004) | (0.670855,−2.582801) |
| 47 | (10.190798, 2.922164) | (6.294943,1.805059) | (0.885041,−2.021227) | (0.684395,−2.594257) |
| 48 | (10.138247, 3.099573) | (6.334018,1.936513) | (0.907015,−2.019386) | (0.697855,−2.605883) |
| 49 | (10.082608, 3.276038) | (6.370334,2.069853) | (0.929115,−2.017482) | (0.711235,−2.617674) |
| 50 | (10.023898, 3.451505) | (6.403807,2.205010) | (0.951352,−2.015514) | (0.724533,−2.629625) |
| 51 | (9.962134, 3.625920) | (6.434359,2.341913) | (0.973740,−2.013481) | (0.737749,−2.641732) |
| 52 | (9.897336, 3.799231) | (6.461908,2.480489) | (0.996219,−2.011386) | (0.750883,−2.653988) |
| 53 | (9.829522, 3.971385) | (6.486379,2.620658) | (1.018885,−2.009223) | (0.763934,−2.666390) |
| 54 | (9.758715, 4.142329) | (6.507697,2.762341) | (1.041600,−2.007000) | (0.776902,−2.678933) |
| 55 | (9.684935, 4.312011) | (6.525791,2.905453) | (1.064479,−2.004709) | (0.789786,−2.691610) |
| 56 | (9.608205, 4.480380) | (6.540591,3.049908) | (1.087481,−2.002353) | (0.802586,−2.704417) |
| 57 | (9.528548, 4.647384) | (6.552029,3.195615) | (1.110603,−1.999934) | (0.815302,−2.717350) |
| 58 | (9.445989, 4.812972) | (6.560042,3.342482) | (1.133843,−1.997452) | (0.827934,−2.730402) |
| 59 | (9.360553, 4.977094) | (6.564567,3.490412) | (1.154751,−1.995053) | (0.840482,−2.743570) |
| 60 | (9.272265, 5.139700) | (6.565546,3.639309) | (1.180725,−1.992167) | (0.852945,−2.756848) |
| 61 | (9.181152, 5.300741) | (6.562926,3.789070) | (1.204304,−1.989499) | (0.865323,−2.770231) |
| 62 | (9.087243, 5.460167) | (6.556645,3.939592) | (1.227992,−1.986771) | (0.877617,−2.783715) |
| 63 | (8.990566, 5.617929) | (6.546685,4.090765) | (1.251784,−1.983983) | (0.889826,−2.797294) |
| 64 | (8.891150, 5.773981) | (6.532895,4.242480) | (1.275678,−1.981138) | (0.901951,−2.810965) |
| 65 | (8.789026, 5.928273) | (6.515398,4.394640) | (1.299669,−1.978237) | (0.913991,−2.824722) |
| 66 | (8.684225, 6.080760) | (6.494050,4.547131) | (1.323757,−1.975281) | (0.925948,−2.838560) |
| 67 | (8.576779, 6.231394) | (6.468845,4.699835) | (1.347935,−1.972271) | (0.937820,−2.852476) |
| 68 | (8.466720, 6.380131) | (6.439745,4.852637) | (1.372205,−1.969209) | (0.949608,−2.866465) |
| 69 | (8.354081, 6.526924) | (6.406724,5.005420) | (1.396559,−1.966097) | (0.961313,−2.880522) |
| 70 | (8.238899, 6.671728) | (6.369760,5.158066) | (1.420994,−1.962937) | (0.972935,−2.894644) |
| 71 | (8.121206, 6.814501) | (6.328833,5.310454) | (1.445510,−1.959731) | (0.984474,−2.908825) |
| 72 | (8.001040, 6.955198) | (6.283929,5.462466) | (1.470177,−1.956472) | (0.995930,−2.923062) |
| 73 | (7.878436, 7.093776) | (6.235036,5.613980) | (1.494765,−1.953189) | (1.007304,−2.937351) |
| 74 | (7.753433, 7.230193) | (6.182149,5.764872) | (1.519494,−1.949855) | (1.018596,−2.951689) |
| 75 | (7.626068, 7.364408) | (6.125265,5.915022) | (1.544290,−1.946482) | (1.029807,−2.966070) |
| 76 | (7.496379, 7.496379) | (6.064385,6.064305) | (1.569151,−1.943073) | (1.040937,−2.980491) |
| 77 | (7.364408, 7.626068) | (5.999517,6.212599) | (1.594068,−1.939630) | (1.051987,−2.994950) |
| 78 | (7.230193, 7.753433) | (5.930670,6.359780) | (1.619042,−1.936154) | (1.062957,−3.009441) |
| 79 | (7.093776, 7.878436) | (5.857858,6.505724) | (1.644070,−1.932649) | (1.073847,−3.023962) |
| 80 | (6.955198, 8.001040) | (5.781102,6.650309) | (1.669143,−1.929117) | (1.084658,−3.038510) |
| 81 | (6.814501, 8.121206) | (5.700425,6.793411) | (1.694264,−1.925559) | (1.095391,−3.053085) |
| 82 | (6.671728, 8.238898) | (5.615853,6.934908) | (1.719427,−1.921978) | (1.106046,−3.067670) |
| 83 | (6.526924, 8.354081) | (5.527419,7.074678) | (1.744628,−1.918376) | (1.116624,−3.082278) |
| 84 | (6.380131, 8.466720) | (5.435158,7.212602) | (1.769868,−1.914755) | (1.127125,−3.096899) |
| 85 | (6.231394, 8.576779) | (5.339111,7.348558) | (1.795138,−1.911119) | (1.137550,−3.111531) |
| 86 | (6.080760, 8.684225) | (5.239324,7.482429) | (1.820439,−1.907468) | (1.147899,−3.126171) |
| 87 | (5.928273, 8.789026) | (5.135839,7.614096) | (1.845767,−1.903806) | (1.158173,−3.140816) |
| 88 | (5.773981, 8.891150) | (5.028725,7.743454) | (1.871120,−1.900133) | (1.168374,−3.155465) |
| 89 | (5.617929, 8.990566) | (4.918023,7.870377) | (1.896492,−1.896454) | (1.178500,−3.170113) |
| 90 | (5.460167, 9.087243) | (4.803797,7.994755) | (1.921885,−1.892769) | (1.188553,−3.184760) |
| 91 | (5.300741,9.181152) | (4.686112,8.116477) | (1.947292,−1.889083) | (1.198534,−3.199402) |
| 92 | (5.139700, 9.272265) | (4.565036,8.235433) | (1.972711,−1.885394) | (1.208443,−3.214037) |
| 93 | (4.977094, 9.360553) | (4.440640,8.351518) | (1.998145,−1.881705) | (1.218281,−3.228663) |
| 94 | (4.812972, 9.445989) | (4.313000,8.464628) | (2.023584,−1.878019) | (1.228049,−3.243279) |
| 95 | (4.647384, 9.528548) | (4.182196,8.574660) | (2.048696,−1.874381) | (1.237746,−3.257881) |
| 96 | (4.480380, 9.608205) | (4.048310,8.681515) | (2.074342,−1.870675) | (1.247375,−3.272468) |
| 97 | (4.312011, 9.684935) | (3.911428,8.785096) | (2.099937,−1.866988) | (1.256934,−3.287039) |
| 98 | (4.142329, 9.758715) | (3.771640,8.885310) | (2.125386,−1.863333) | (1.266426,−3.301590) |
| 99 | (3.971385, 9.829522) | (3.629037,8.982066) | (2.150829,−1.859689) | (1.275850,−3.316121) |
| 100 | (3.799231, 9.897336) | (3.483717,9.075275) | (2.176273,−1.856059) | (1.285208,−3.330631) |
| 101 | (3.625920, 9.962134) | (3.335777,9.164852) | (2.201637,−1.852439) | (1.294500,−3.345116) |
| 102 | (3.451505,10.023898) | (3.185319,9.250717) | (2.227133,−1.848843) | (1.303726,−3.359577) |
| 103 | (3.276038,10.082608) | (3.032447,9.332790) | (2.252834,−1.845241) | (1.312887,−3.374011) |
| 104 | (3.099573,10.138247) | (2.877267,9.410995) | (2.277935,−1.841723) | (1.321985,−3.388417) |
| 105 | (2.922164,10.190798) | (2.719891,9.485263) | (2.303318,−1.838184) | (1.331019,−3.402793) |
| 106 | (2.743865,10.240245) | (2.560428,9.555523) | (2.328695,−1.834666) | (1.339990,−3.417140) |
| 107 | (2.564730,10.286572) | (2.398994,9.621712) | (2.354048,−1.831172) | (1.348898,−3.431454) |
| 108 | (2.384814,10.329766) | (2.235704,9.683769) | (2.379374,−1.827704) | (1.357745,−3.445735) |
| 109 | (2.204172,10.369814) | (2.070676,9.741636) | (2.404687,−1.824260) | (1.366532,−3.459983) |
| 110 | (2.022858,10.406702) | (1.904031,9.795261) | (2.430114,−1.820801) | (1.375257,−3.474195) |
| 111 | (1.840928,10.440421) | (1.735891,9.844594) | (2.455303,−1.817446) | (1.383923,−3.488372) |
| 112 | (1.658437,10.470960) | (1.566378,9.889588) | (2.475715,−1.814679) | (1.392530,−3.502512) |
| 113 | (1.475441,10.498309) | (1.395618,9.930204) | (2.501099,−1.811266) | (1.401078,−3.516614) |
| 114 | (1.291996,10.522460) | (1.223737,9.966402) | (2.526406,−1.807891) | (1.409568,−3.530676) |
| 115 | (1.108157,10.543405) | (1.050863,9.998151) | (2.551489,−1.804569) | (1.418002,−3.544696) |
| 116 | (0.923980,10.561140) | (0.877124,10.025416) | (2.576437,−1.801288) | (1.426379,−3.558678) |
| 117 | (0.739522,10.575657) | (0.702648,10.048188) | (2.601558,−1.798008) | (1.434698,−3.572622) |
| 118 | (0.554839,10.586952) | (0.527568,10.066393) | (2.628641,−1.794518) | (1.442959,−3.586532) |
| 119 | (0.369986,10.595023) | (0.352012,10.080206) | (2.657369,−1.790883) | (1.451165,−3.600401) |
| 120 | (0.185021,10.599867) | (0.176116,10.088896) | (2.681569,−1.787826) | (1.459319,−3.614217) |
| 121 | (0.000000,10.601481) | (0.000000,10.093058) | (2.705059,−1.784856) | (1.467426,−3.627971) |

According to the embodiment illustrated in FIGS. 1-6B, the surface PS1 is semispherical. Thus, the surface PS1 can be approximated by a set of points (x, y, z) defined by Equation 2, where the center of the sphere is ($x_0$, $y_0$, and $z_0$) and the radius of the sphere is r.

$$r^2=(x-x_0)^2+(y-y_0)^2+(z-z_0)^2 \qquad \text{Equation 2}$$

The surface PS3 can be approximated by a set of points (x, y) defined by the sixth-order polynomial of Equation 3. The polynomial of Equation 3 was derived from the data in Table 1. While the set of points (x, y) can be approximated by a sixth-order polynomial, a polynomial having a lower or higher order may be used. Additionally, the surface PS3 may be approximated by or be defined by another equation.

$$y=-0.000044x^6+0.003106x^5-0.022809x^4+ \\ 0.049379x^3+0.009716x^2+0.003407x-2.053740 \qquad \text{Equation 3}$$

According to the embodiment illustrated in FIGS. 1-6B, the surface PS4 takes the same Harris shape as the imaginary picture plane IPP along at least a portion of the cross-section. The surface PS4 can be approximated by a set of points (x, y) defined by the sixth-order polynomial of Equation 4. The polynomial of Equation 4 was derived from the data in Table 1. While the set of points (x, y) can be approximated by a sixth-order polynomial, a polynomial having a lower or higher order may be used. Additionally, the surface PS4 may be approximated by or be defined by another equation.

$$y=-0.031617x^6+0.157514x^5-0.230715x^4+ \\ 0.105277x^3-0.623794x^2+0.002439x-2.307265 \qquad \text{Equation 4}$$

Reflective Lenses

Figure 7:
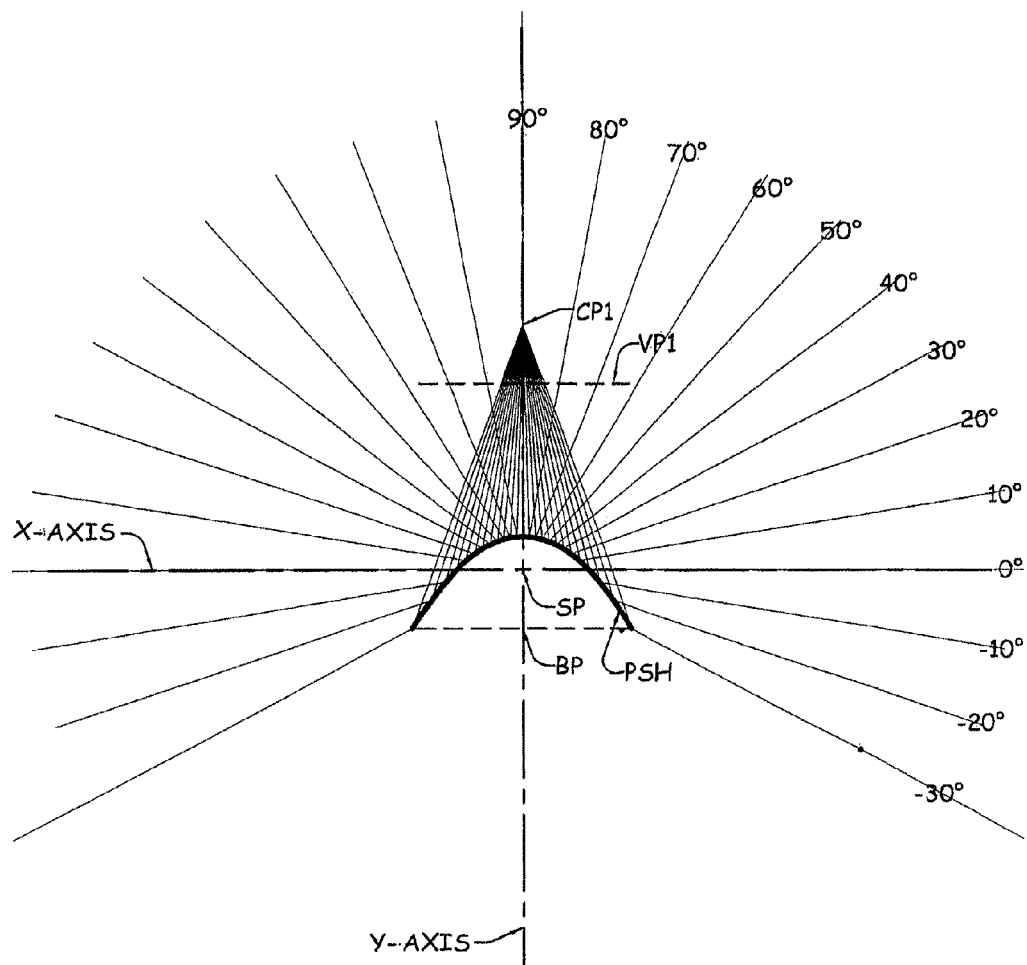
FIG. 7 is a cross-section of a reflective lens according to one embodiment.

Whereas a camera using the refractive lens may be located below the lens near the camera point CP2, as shown in FIG. 1, a camera using a reflective lens may be located above the lens near a camera point CP1, as shown in FIG. 7. In certain embodiments, the images captured using the refractive and reflective lenses are identical with the possible exception that the camera itself may be seen in the image captured using the reflective lens.

With reference to FIG. 7, light rays, depicted by arrows distributed from −30 degrees to 90 degrees about station point SP, intersect a surface PSH and are reflected to the camera point CP1. In other words, all the light rays within the field of view heading toward the station point SP are reflected toward the camera point CP1. A flat image may be photographically or digitally stored at a focal plane or viewing plane VP1 as previously described with reference to FIGS. 1 through 6. As viewed in cross-section, if the extent of the image as viewed from camera point CP1 is divided into equal angular increments, and the extent of the image as viewed from the station point SP is divided by the same number of equal angular increments then the cross-sectional surface of a Harris shape may be defined by the intersections of the individual lines representing the angular increments converging on the station point SP with the respective individual lines representing the angular increments that converge on camera point CP1. A Harris shape three dimensional surface may be defined when this cross-section is rotated about the central axis containing the station point SP and camera point CP1. The Harris shape results in an image having a uniform density as experienced by the viewer, located at the station point SP, across the entire viewing surface.

Figure 8:
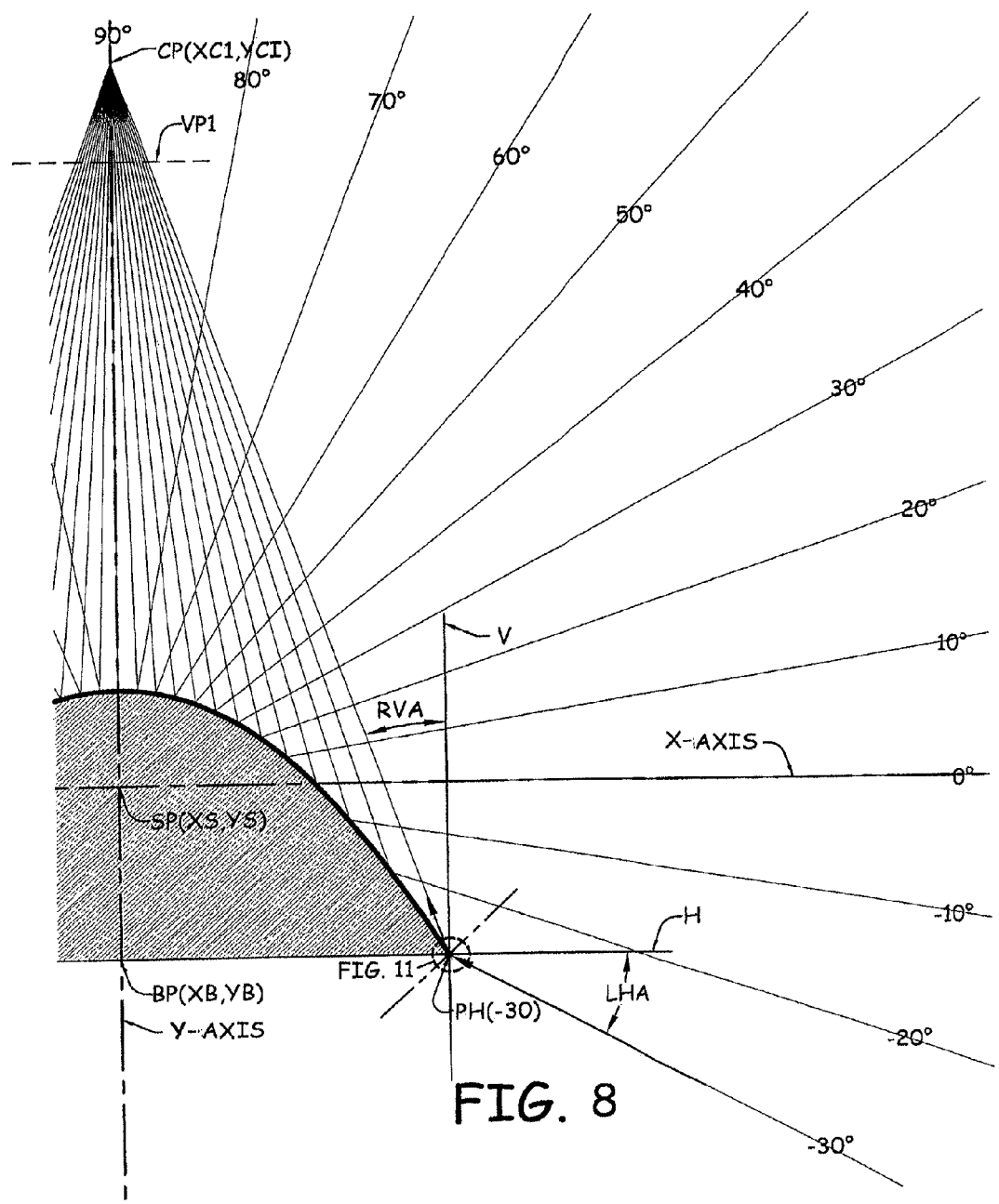
FIG. 8 is an enlarged cross-section of the reflective lens of FIG. 7.

Referring to FIG. 8, the light rays heading to the station point SP are reflected to the camera point CP1 and a two dimensional flat image is captured at the viewing plane VP1.

The reflective lens may be made from steel using a computer numerically controlled (CNC) metal lathe process and plated with chrome to provide reflectivity. The camera used can be film or digital, and can collect still or moving images.

FIG. 9 illustrates a detailed cross-section of point PH(-30) of FIG. 8. The ray R1(-30) was heading to the station point SP in the AIR at 30 degrees below the x-axis. After the ray intersects with the surface PSH, it is redirected toward the camera point CP1. The ray R1 indicates a ray of light, in the AIR, prior to intersection of the surface PSH and the ray R2 designates the ray of light, in the AIR, after the intersection at the reflective surface PSH. The neutral line N is perpendicular to line T. The line T is the tangent line to the surface PS1 at point PS(-30). The line H is the horizontal line or x-axis. The angle from the light ray R1(-30) to the vertical line V is LVA. The angle from the light ray R1(-30) to the neutral line N is LNA. The angle from the light ray R1(-30) to the horizontal line H is RHA. The angle from the light ray R2(-30) to the vertical line V is RVA.

Table 2 below contains a set of 121 points on the right had side of the y-axis that lie on an example surface PSH shown in FIG. 7. Because the surface PSH is symmetrical about the y-axis, the set of points can be rotated around the y-axis to determine other points that lie on the example surface PSH. The data Table 2 can represent data having any unit and can be scaled to any desired overall size.

TABLE 2

| Point | Surface PSH (x,y) |
|---|---|
| 1 | (3.000000,−1.732051) |
| 2 | (2.939252,−1.629254) |
| 3 | (2.880914,−1.531809) |
| 4 | (2.824805,−1.439310) |
| 5 | (2.770761-1.351391) |
| 6 | (2.718635,−1.267720) |
| 7 | (2.668293,−1.188001) |
| 8 | (2.619613,−1.111960) |
| 9 | (2.572485,−1.039351) |
| 10 | (2.526808,−0.969951) |
| 11 | (2.482490,−0.903552) |
| 12 | (2.439447,−0.839969) |
| 13 | (2.397601,−0.779028) |
| 14 | (2.356882,−0.720571) |
| 15 | (2.317223,−0.664453) |
| 16 | (2.278565,−0.610540) |
| 17 | (2.240851,−0.558707) |
| 18 | (2.204030,−0.508841) |
| 19 | (2.168054,−0.460834) |
| 20 | (2.132879,−0.414590) |
| 21 | (2.098463,−0.370016) |
| 22 | (2.064767,−0.327027) |
| 23 | (2.031755,−0.285545) |
| 24 | (1.999395,−0.245495) |
| 25 | (1.967655,−0.206809) |
| 26 | (1.936505,−0.169422) |
| 27 | (1.905918,−0.133275) |
| 28 | (1.875868,−0.098310) |
| 29 | (1.846331,−0.064475) |
| 30 | (1.817284,−0.031721) |
| 31 | (1.788705,0.000000) |
| 32 | (1.760576,0.030731) |
| 33 | (1.732875,0.060513) |
| 34 | (1.705586,0.089386) |
| 35 | (1.678692,0.117386) |
| 36 | (1.652176,0.144547) |
| 37 | (1.626023,0.170902) |
| 38 | (1.600219,0.196482) |
| 39 | (1.574749,0.221317) |
| 40 | (1.549602,0.245433) |
| 41 | (1.524765,0.268857) |
| 42 | (1.500226,0.291614) |
| 43 | (1.475973,0.313728) |
| 44 | (1.451997,0.335220) |

TABLE 2-continued

| Point | Surface PSH (x,y) |
|---|---|
| 45 | (1.428287,0.356112) |
| 46 | (1.404833,0.376424) |
| 47 | (1.381626,0.396175) |
| 48 | (1.358658,0.415384) |
| 49 | (1.335921,0.434067) |
| 50 | (1.313405,0.452241) |
| 51 | (1.291103,0.469923) |
| 52 | (1.269008,0.487127) |
| 53 | (1.247113,0.503866) |
| 54 | (1.225412,0.520156) |
| 55 | (1.203896,0.536009) |
| 56 | (1.182561,0.551437) |
| 57 | (1.161401,0.566453) |
| 58 | (1.140409,0.581067) |
| 59 | (1.119580,0.595291) |
| 60 | (1.098909,0.609135) |
| 61 | (1.078390,0.622609) |
| 62 | (1.058019,0.635722) |
| 63 | (1.037791,0.648484) |
| 64 | (1.017701,0.660903) |
| 65 | (0.997745,0.672987) |
| 66 | (0.977918,0.684745) |
| 67 | (0.958216,0.696185) |
| 68 | (0.938636,0.707313) |
| 69 | (0.919173,0.718137) |
| 70 | (0.899824,0.728663) |
| 71 | (0.880584,0.738898) |
| 72 | (0.861451,0.748848) |
| 73 | (0.842421,0.758520) |
| 74 | (0.823491,0.767918) |
| 75 | (0.804657,0.777048) |
| 76 | (0.785917,0.785917) |
| 77 | (0.767266,0.794527) |
| 78 | (0.748703,0.802886) |
| 79 | (0.730224,0.810996) |
| 80 | (0.711827,0.818863) |
| 81 | (0.693509,0.826491) |
| 82 | (0.675266,0.833884) |
| 83 | (0.657098,0.841047) |
| 84 | (0.639000,0.847981) |
| 85 | (0.620970,0.854692) |
| 86 | (0.603007,0.861183) |
| 87 | (0.585108,0.867458) |
| 88 | (0.567269,0.873518) |
| 89 | (0.549490,0.879368) |
| 90 | (0.531768,0.885011) |
| 91 | (0.514100,0.890448) |
| 92 | (0.496485,0.895683) |
| 93 | (0.478921,0.900719) |
| 94 | (0.461405,0.905557) |
| 95 | (0.443935,0.910201) |
| 96 | (0.426509,0.914652) |
| 97 | (0.409126,0.918912) |
| 98 | (0.391784,0.922984) |
| 99 | (0.374480,0.926869) |
| 100 | (0.357212,0.930570) |
| 101 | (0.339980,0.934087) |
| 102 | (0.322781,0.937423) |
| 103 | (0.305613,0.940579) |
| 104 | (0.288474,0.943556) |
| 105 | (0.271363,0.946356) |
| 106 | (0.254279,0.948981) |
| 107 | (0.237218,0.951430) |
| 108 | (0.220180,0.953706) |
| 109 | (0.203164,0.955809) |
| 110 | (0.186166,0.957741) |
| 111 | (0.169186,0.959502) |
| 112 | (0.152222,0.961093) |
| 113 | (0.135273,0.962514) |
| 114 | (0.118336,0.963767) |
| 115 | (0.101410,0.964852) |
| 116 | (0.084494,0.965769) |
| 117 | (0.067586,0.966518) |
| 118 | (0.050684,0.967101) |
| 119 | (0.033786,0.967517) |
| 120 | (0.016892,0.967767) |
| 121 | (0.000000,0.968016) |

The surface PSH can be approximated by a set of points (x, y) defined by the sixth-order polynomial of Equation 5. The polynomial of Equation 5 was derived from the data in Table 2. While the set of points (x, y) can be approximated by a sixth-order polynomial, a polynomial having a lower or higher order may be used. Additionally, the surface PS3 may be approximated by or be defined by another equation.

$$y = -0.0007x^6 + 0.0077x^5 - 0.0226x^4 + 0.0184x^3 - 0.3006x^2 + 0.0017x + 0.9678 \quad \text{Equation 5}$$

With reference to FIG. 8, the Harris shape may be defined in mathematical terms by rotating the cross-sectional surface defined in Equation 22, about the SP-CP axis. Equation 22 can be used to determine the coordinates of a plurality of points on a cross-section of the Harris shape. A derivation for Equation 22 will be described in more detail with respect to Equation 6 through Equation 21. As shown in Equation 6, the angle RVA is calculated from the arctangent of the change in X over the change in Y. With respect to Equation 6 and FIG. 9, $X_{CP1}$ and $Y_{CP1}$ refer to the X,Y coordinates of the camera point CP1 and $X_{PSH}$ and $Y_{PSH}$ refer to the X,Y coordinates of a point on the surface PSH.

$$RVA_e = \text{aTan}\left(\frac{X_{CP1} - X_e}{Y_{CP1} - Y_e}\right) \quad \text{Equation 6}$$

As shown in Equation 7, the angle LHA is calculated from the arctangent of the change in Y over the change in X. With respect to Equation 7 and FIG. 9, $X_{SP}$ and $Y_{SP}$ refer to the X,Y coordinates of the station point SP and $X_{PSH}$ and $Y_{PSH}$ refer to the X,Y coordinates of a point on the surface PSH.

$$LHA = \text{aTan}\left(\frac{Y_{SP} - Y_{PSH}}{X_{PSH} - X_{SP}}\right) \quad \text{Equation 7}$$

Equation 8 and Equation 9 can be used to define any light ray segment R1 within the field of view and headed to the station point SP, where $X_{PSH}$ and $Y_{PSH}$ represent a X and Y coordinate of a point on the line, M represents the slope of the line and b represents the intersection of the line with the y-axis.

$$Y = M \times X + b \quad \text{Equation 8}$$

Equation 9 refines Equation 8 to represent the ray segment R1.

$$Y_e = \text{Tan}(LHA) \times X_e + Y_{SP} \quad \text{Equation 9}$$

Equation 8 and Equation 10 can be used to define a reflective ray segment R2 corresponding to the ray segment R1 within the field of view and headed to the camera point CP, where Y represents a Y coordinate of a point on the line, X represents the X coordinate of that same point, M represents the slope of the line and b represents the intersection of the line with the y-axis. Equation 10 refines Equation 8 to represent the ray segment R2.

$$Y_e = \text{Tan}(RVA) \times X_e + Y_{CP1} \quad \text{Equation 10}$$

Equation 11 shows that $X_{PSH}$, can be determined from combining Equation 9, which depicts the coordinate $Y_{PSH}$ of the ray segment R1, with Equation 10, which depicts the coordinate $Y_{PSH}$ of the ray segment R2.

$$\text{Tan}(LHA) \times X_e + Y_{SP} = \text{Tan}(RVA) \times X_e + Y_{CP1} \quad \text{Equation 11}$$

Equation 12 is determined by substitution, and since the origin of the coordinate system is at the station point SP (Xsp,Ysp)=(0,0), and Xcp1=0 as it is located on the x axis.

$$\text{Tan}\left(\text{aTan}\left(\frac{Y_{SP} - Y_{PSH}}{X_{PSH} - X_{SP}}\right)\right) \times Xpsh + Ysp = \text{Tan}\left(\left(\text{aTan}\left(\frac{X_e - X_{CP1}}{Y_{CP1} - Y_e}\right) - n \times \Delta F_{RVA}\right) - 90°\right) \times Xpsh + Ycp1 \quad \text{Equation 12}$$

$$\left(\frac{Y_{SP} - Y_{PSH}}{X_{PSH} - X_{SP}}\right) \times Xpsh + Ysp = \text{Tan}\left(\text{aTan}\left(\frac{X_{CP1} - X_e}{Y_{CP1} - Y_e}\right) - n \times \Delta F_{RVA}\right) \times Xpsh + Ycp1 \quad \text{Equation 13}$$

$$\left(\frac{Y_{SP} - Y_{PSH}}{X_{PSH} - X_{SP}}\right) \times Xpsh - \left(\left(\frac{X_{CP1} - X_e}{Y_{CP1} - Y_e}\right) - n \times \Delta F_{RVA}\right) \times Xpsh = Ycp1 - Ysp \quad \text{Equation 14}$$

$$\left(\frac{Y_{SP} - Y_{PSH}}{X_{PSH} - X_{SP}} - \frac{Xcp1 - Xe}{Ycp1 - Ye} + (n \times \Delta Frva)\right) \times Xpsh = Ycp1 - Ysp \quad \text{Equation 15}$$

$$Xpsh = \frac{(Ycp1 - Ysp)}{\frac{Y_{SP} - Y_{PSH}}{X_{PSH} - X_{SP}} - \frac{Xcp1 - Xe}{Ycp1 - Ye} + (n \times \Delta Frva)} \quad \text{Equation 16}$$

$$Xpsh = \frac{(Ycp1 - Ysp)}{\frac{(Y_{SP} - Y_{PSH}) \times (Ycp1 - Ye) - (Xcp1 - Xe) \times (X_{PSH} - X_{SP}) + (n \times \Delta Frva) \times (X_{PSH} - X_{SP}) \times (Ycp1 - Ye)}{(X_{PSH} - X_{SP}) \times (Ycp1 - Ye)}} \quad \text{Equation 17}$$

$$Xpsh = \frac{(Ycp1 - Ysp) \times (X_{PSH} - X_{SP}) \times (Ycp1 - Ye)}{(Y_{SP} - Y_{PSH}) \times (Ycp1 - Ye) - (Xcp1 - Xe) \times (X_{PSH} - X_{SP}) + (n \times \Delta Frva) \times (X_{PSH} - X_{SP}) \times (Ycp1 - Ye)} \quad \text{Equation 18}$$

$$\left(\frac{1}{Xpsh}\right) = \frac{(Y_{SP} - Y_{PSH}) \times (Ycp1 - Ye) - (Xcp1 - Xe) \times (X_{PSH} - X_{SP}) + (n \times \Delta Frva) \times (X_{PSH} - X_{SP}) \times (Ycp1 - Ye)}{(Ycp1 - Ysp) \times (X_{PSH} - X_{SP}) \times (Ycp1 - Ye)} \quad \text{Equation 19}$$

$$\left(\frac{(Ycp1 - Ysp) \times (X_{PSH} - X_{SP}) \times (Ycp1 - Ye)}{Xpsh}\right) = (Y_{SP} - Y_{PSH}) \times (Ycp1 - Ye) - (Xcp1 - Xe) \times (X_{PSH} - X_{SP}) + (n \times \Delta Frva) \times (X_{PSH} - X_{SP}) \times (Ycp1 - Ye) \quad \text{Equation 20}$$

$$\left(\frac{(Ycp1 - Ysp) \times (X_{PSH} - X_{SP}) \times (Ycp1 - Ye)}{Xpsh}\right) + (Xcp1 - Xe) \times (X_{PSH} - X_{SP}) - (n \times \Delta Frva) \times (X_{PSH} - X_{SP}) \times (Ycp1 - Ye) = (Y_{SP} - Y_{PSH}) \times (Ycp1 - Ye) \quad \text{Equation 21}$$

$$Y_{PSH} = Y_{SP} - \frac{\left(\frac{(Ycp1 - Ysp) \times (X_{PSH} - X_{SP}) \times (Ycp1 - Ye)}{Xpsh}\right) + (Xcp1 - Xe) \times (X_{PSH} - X_{SP}) - (n \times \Delta Frva) \times (X_{PSH} - X_{SP}) \times (Ycp1 - Ye)}{(Ycp1 - Ye)} \quad \text{Equation 22}$$

As the value of n changes, points on the cross-section of the surface PSH are defined. In this example, Equation 22, with n=5, would appear as Equation 23 when solving for Ypsh for the illustrative embodiment.

$$Y_{PSH} = 0 - \frac{\left(\frac{(7.2679 - 0) \times (X_{PSH} - 0) \times (7.2679 - -1.7321)}{X_{PSH}}\right) + (0 - 3) \times (X_{PSH} - 0) - \left(5 \times \frac{RVAe}{D}\right) \times (X_{PSH} - 0) \times (X_{PSH} - 0) \times (7.2679 - -1.7321)}{(7.2679 - -1.7321)} \quad \text{Equation 23}$$

$$Y_{PSH} = 0 - \frac{\left(\frac{(7.2679) \times (X_{PSH}) \times (9)}{Xpsh}\right) + (-3) \times (X_{PSH}) - \left(5 \times \frac{18.4348}{120}\right) \times (X_{PSH}) \times (9)}{(9)} \quad \text{Equation 24}$$

$$Y_{PSH} = -(7.2679) - \left(\frac{3}{9}\right) \times (X_{PSH}) - \left(5 \times \frac{18.4348}{120}\right) \times (X_{PSH}) \quad \text{Equation 25}$$

$$Y_{PSH} = \left(-(7.2679) - \left(\frac{3}{9}\right) - \left(5 \times \frac{18.4348}{120}\right)\right) \times (X_{PSH}) \quad \text{Equation 26}$$

Table 3 below contains a set of points derived from the example above on the right hand side of the y-axis that lie on the surface PSH of FIG. 7. In particular, Table 3 contains a set of 121 points that lie on the surface PSH. Because the surface PSH is symmetrical about the y-axis, the set of points can be rotated around the y-axis to determine other points that lie on the surface PSH. The data in Table 3 can represent data having any unit and can be scaled to any desired overall size.

TABLE 3

| LHA ( ) | RVA ( ) | X | Y |
|---|---|---|---|
| −30.0000 | 18.4349 | 3.000000 | −1.732051 |
| −29.0000 | 18.2813 | 2.939252 | −1.629254 |
| −28.0000 | 18.1277 | 2.880914 | −1.531809 |
| −27.0000 | 17.9741 | 2.824805 | −1.439310 |
| −26.0000 | 17.8205 | 2.770761 | −1.351391 |
| −25.0000 | 17.6668 | 2.718635 | −1.267720 |
| −24.0000 | 17.5132 | 2.668293 | −1.188001 |
| −23.0000 | 17.3596 | 2.619613 | −1.111960 |
| −22.0000 | 17.2060 | 2.572485 | −1.039351 |
| −21.0000 | 17.0523 | 2.526808 | −0.969951 |
| −20.0000 | 16.8987 | 2.482490 | −0.903552 |
| −19.0000 | 16.7451 | 2.439447 | −0.839969 |
| −18.0000 | 16.5915 | 2.397601 | −0.779028 |
| −17.0000 | 16.4378 | 2.356882 | −0.720571 |
| −16.0000 | 16.2842 | 2.317223 | −0.664453 |
| −15.0000 | 16.1306 | 2.278565 | −0.610540 |
| −14.0000 | 15.9770 | 2.240851 | −0.558707 |
| −13.0000 | 15.8233 | 2.204030 | −0.508841 |
| −12.0000 | 15.6697 | 2.168054 | −0.460834 |
| −11.0000 | 15.5161 | 2.132879 | −0.414590 |
| −10.0000 | 15.3625 | 2.098463 | −0.370016 |
| −9.0000 | 15.2088 | 2.064767 | −0.327027 |
| −8.0000 | 15.0552 | 2.031755 | −0.285545 |
| −7.0000 | 14.9016 | 1.999395 | −0.245495 |
| −6.0000 | 14.7480 | 1.967655 | −0.206809 |
| −5.0000 | 14.5943 | 1.936505 | −0.169422 |
| −4.0000 | 14.4407 | 1.905918 | −0.133275 |
| −3.0000 | 14.2871 | 1.875868 | −0.098310 |
| −2.0000 | 14.1335 | 1.846331 | −0.064475 |
| −1.0000 | 13.9798 | 1.817284 | −0.031721 |
| 0.0000 | 13.8262 | 1.788705 | 0.000000 |
| 1.0000 | 13.6726 | 1.760576 | 0.030731 |
| 2.0000 | 13.5190 | 1.732875 | 0.060513 |
| 3.0000 | 13.3653 | 1.705586 | 0.089386 |
| 4.0000 | 13.2117 | 1.678692 | 0.117386 |
| 5.0000 | 13.0581 | 1.652176 | 0.144547 |
| 6.0000 | 12.9045 | 1.626023 | 0.170902 |
| 7.0000 | 12.7508 | 1.600219 | 0.196482 |
| 8.0000 | 12.5972 | 1.574749 | 0.221317 |
| 9.0000 | 12.4436 | 1.549602 | 0.245433 |
| 10.0000 | 12.2900 | 1.524765 | 0.268857 |
| 11.0000 | 12.1363 | 1.500226 | 0.291614 |
| 12.0000 | 11.9827 | 1.475973 | 0.313728 |
| 13.0000 | 11.8291 | 1.451997 | 0.335220 |
| 14.0000 | 11.6755 | 1.428287 | 0.356112 |
| 15.0000 | 11.5218 | 1.404833 | 0.376424 |
| 16.0000 | 11.3682 | 1.381626 | 0.396175 |
| 17.0000 | 11.2146 | 1.358658 | 0.415384 |
| 18.0000 | 11.0610 | 1.335921 | 0.434067 |
| 19.0000 | 10.9073 | 1.313405 | 0.452241 |
| 20.0000 | 10.7537 | 1.291103 | 0.469923 |
| 21.0000 | 10.6001 | 1.269008 | 0.487127 |
| 22.0000 | 10.4465 | 1.247113 | 0.503866 |
| 23.0000 | 10.2928 | 1.225412 | 0.520156 |
| 24.0000 | 10.1392 | 1.203896 | 0.536009 |
| 25.0000 | 9.9856 | 1.182561 | 0.551437 |
| 26.0000 | 9.8320 | 1.161401 | 0.566453 |
| 27.0000 | 9.6783 | 1.140409 | 0.581067 |
| 28.0000 | 9.5247 | 1.119580 | 0.595291 |
| 29.0000 | 9.3711 | 1.098909 | 0.609135 |
| 30.0000 | 9.2175 | 1.078390 | 0.622609 |
| 31.0000 | 9.0638 | 1.058019 | 0.635722 |
| 32.0000 | 8.9102 | 1.037791 | 0.648484 |
| 33.0000 | 8.7566 | 1.017701 | 0.660903 |
| 34.0000 | 8.6030 | 0.997745 | 0.672987 |
| 35.0000 | 8.4494 | 0.977918 | 0.684745 |
| 36.0000 | 8.2957 | 0.958216 | 0.696185 |
| 37.0000 | 8.1421 | 0.938636 | 0.707313 |
| 38.0000 | 7.9885 | 0.919173 | 0.718137 |
| 39.0000 | 7.8349 | 0.899824 | 0.728663 |
| 40.0000 | 7.6812 | 0.880584 | 0.738898 |
| 41.0000 | 7.5276 | 0.861451 | 0.748848 |
| 42.0000 | 7.3740 | 0.842421 | 0.758520 |
| 43.0000 | 7.2204 | 0.823491 | 0.767918 |
| 44.0000 | 7.0667 | 0.804657 | 0.777048 |
| 45.0000 | 6.9131 | 0.785917 | 0.785917 |
| 46.0000 | 6.7595 | 0.767266 | 0.794527 |
| 47.0000 | 6.6059 | 0.748703 | 0.802886 |
| 48.0000 | 6.4522 | 0.730224 | 0.810996 |
| 49.0000 | 6.2986 | 0.711827 | 0.818863 |
| 50.0000 | 6.1450 | 0.693509 | 0.826491 |
| 51.0000 | 5.9914 | 0.675266 | 0.833884 |
| 52.0000 | 5.8377 | 0.657098 | 0.841047 |
| 53.0000 | 5.6841 | 0.639000 | 0.847981 |
| 54.0000 | 5.5305 | 0.620970 | 0.854692 |
| 55.0000 | 5.3769 | 0.603007 | 0.861183 |
| 56.0000 | 5.2232 | 0.585108 | 0.867458 |
| 57.0000 | 5.0696 | 0.567269 | 0.873518 |
| 58.0000 | 4.9160 | 0.549490 | 0.879368 |
| 59.0000 | 4.7624 | 0.531768 | 0.885011 |
| 60.0000 | 4.6087 | 0.514100 | 0.890448 |
| 61.0000 | 4.4551 | 0.496485 | 0.895683 |
| 62.0000 | 4.3015 | 0.478921 | 0.900719 |
| 63.0000 | 4.1479 | 0.461405 | 0.905557 |
| 64.0000 | 3.9942 | 0.443935 | 0.910201 |
| 65.0000 | 3.8406 | 0.426509 | 0.914652 |
| 66.0000 | 3.6870 | 0.409126 | 0.918912 |
| 67.0000 | 3.5334 | 0.391784 | 0.922984 |
| 68.0000 | 3.3797 | 0.374480 | 0.926869 |
| 69.0000 | 3.2261 | 0.357212 | 0.930570 |
| 70.0000 | 3.0725 | 0.339980 | 0.934087 |
| 71.0000 | 2.9189 | 0.322781 | 0.937423 |
| 72.0000 | 2.7652 | 0.305613 | 0.940579 |
| 73.0000 | 2.6116 | 0.288474 | 0.943556 |
| 74.0000 | 2.4580 | 0.271363 | 0.946356 |
| 75.0000 | 2.3044 | 0.254279 | 0.948981 |
| 76.0000 | 2.1507 | 0.237218 | 0.951430 |
| 77.0000 | 1.9971 | 0.220180 | 0.953706 |
| 78.0000 | 1.8435 | 0.203164 | 0.955809 |
| 79.0000 | 1.6899 | 0.186166 | 0.957741 |
| 80.0000 | 1.5362 | 0.169186 | 0.959502 |
| 81.0000 | 1.3826 | 0.152222 | 0.961093 |
| 82.0000 | 1.2290 | 0.135273 | 0.962514 |
| 83.0000 | 1.0754 | 0.118336 | 0.963767 |
| 84.0000 | 0.9217 | 0.101410 | 0.964852 |
| 85.0000 | 0.7681 | 0.084494 | 0.965769 |
| 86.0000 | 0.6145 | 0.067586 | 0.966518 |
| 87.0000 | 0.4609 | 0.050684 | 0.967101 |
| 88.0000 | 0.3072 | 0.033786 | 0.967517 |
| 89.0000 | 0.1536 | 0.016892 | 0.967767 |
| 90.0000 | 0.0000 | 0.000000 | 0.968016 |

The surface PSH can be approximated by a set of points (x, y) defined by the sixth-order polynomial of Equation 27. The polynomial of Equation 27 was derived from the data in Table 3. While the set of points (x, y) can be approximated by a sixth-order polynomial, a polynomial having a lower or higher order may be used. Additionally, the surface PS3 may be approximated by or be defined by another equation.

$$y = -0.0007x^6 + 0.0077x^5 - 0.0226x^4 + 0.0184x^3 - 0.3006x^2 + 0.0017x + 0.9678 \quad \text{Equation 27}$$

Image Generation

Figure 10A:
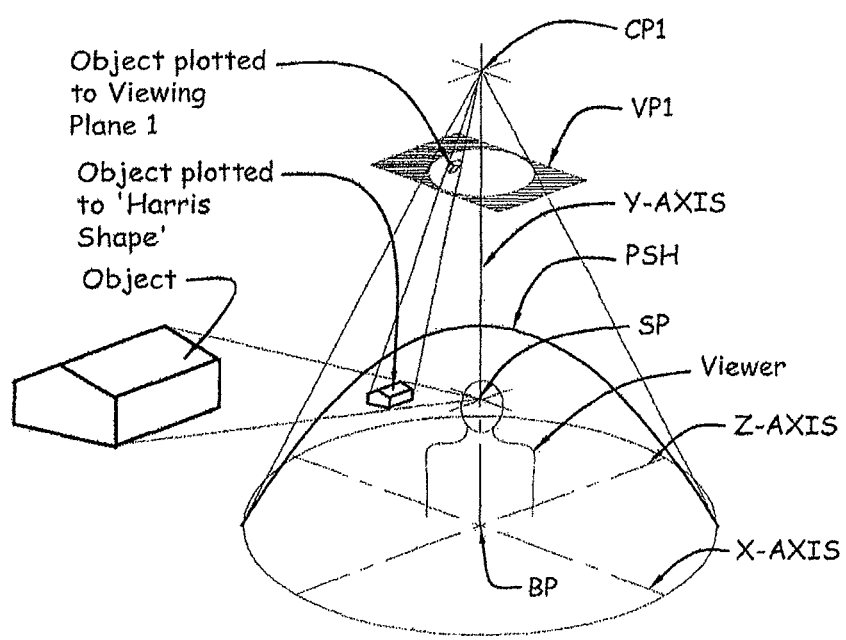
FIG. 10A is a perspective view of a display according to one embodiment.
Figure 11:
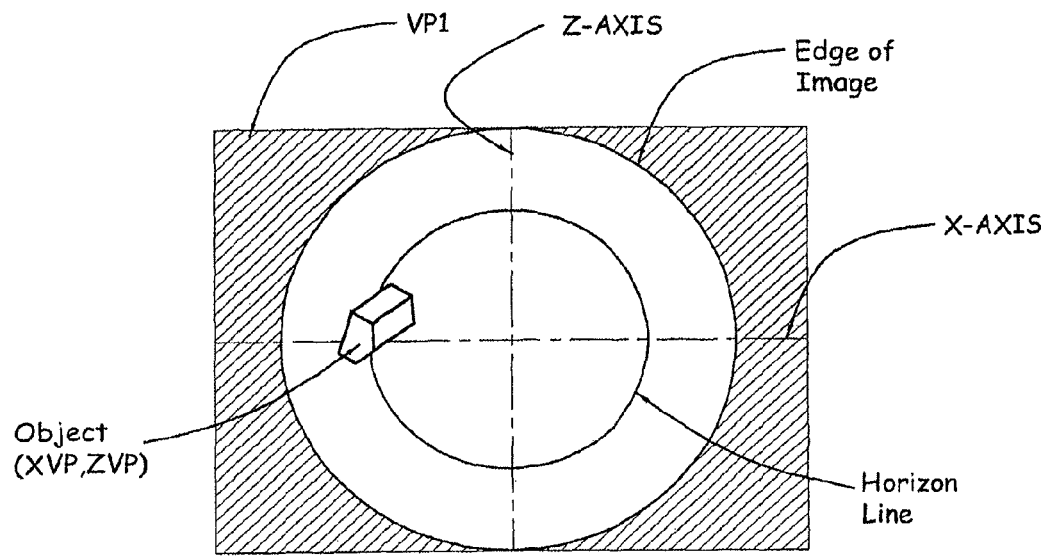
FIG. 11A illustrates an example of an image that might be captured using the refractive lens of FIG. 1 or reflective lens of FIG. 7.
FIG. 11B illustrates an example of an image that might captured using a fisheye lens.
Figure 11:
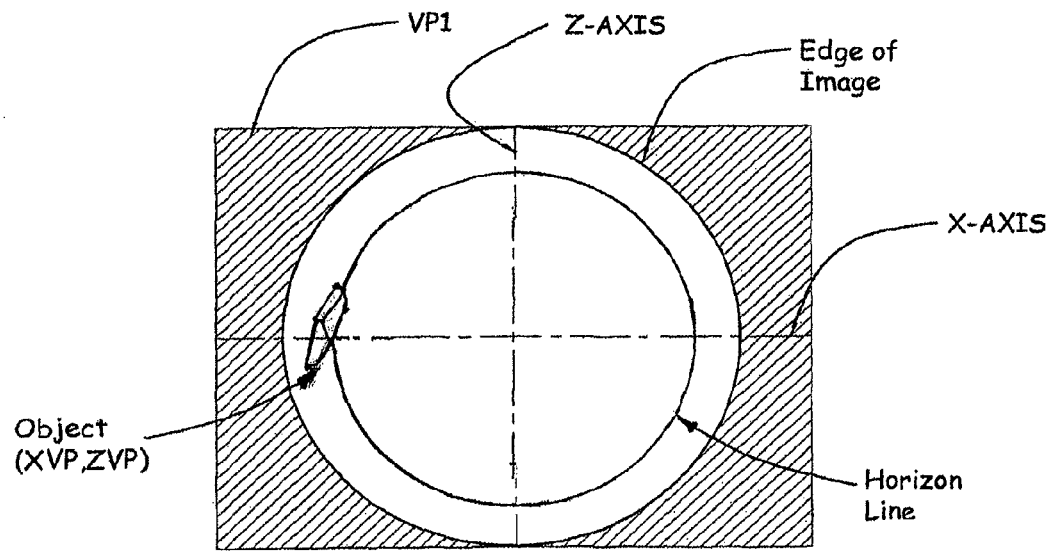

FIG. 10A illustrates one example of an anamorphic image (i.e., an image distorted in certain respects, such as aspect ratio, magnification, skew, interior angle(s), straightness, or curvature) on a viewing plane VP1 being projected onto a viewing surface PSH. FIG. 11A illustrates an example of an anamorphic image that might be collected at the viewing plane VP1 (FIG. 7) or the viewing plane VP2 (FIG. 1) (e.g., FIG. 11A illustrates how the anamorphic image would appear if displayed on a traditional monitor). In other words, an image captured on the viewing plane VP1 (FIG. 7) or the viewing plane VP2 (FIG. 1) is two-dimensional and flat. When an anamorphic image captured at the viewing plane VP1 or VP2 is projected onto a viewing surface PSH (e.g., having the shape depicted in FIG. 12A), the projected image is elongated where it intersects the viewing surface PSH at an angle and the projected image on the viewing surface PSH is foreshortened as viewed from the station point SP, resulting in an image having a uniform density for the point of view of a viewer at the station point SP.

As previously described, an anamorphic image captured at the viewing plane VP1 (FIG. 7) or the viewing plane VP2 (FIG. 1) can span approximately 120 zenith degrees (e.g., have an approximately 240 degree vertical field of view). FIG. 11A illustrates a horizon line H representing the horizon in a captured image. According to one embodiment, the distance between the station point SP (e.g., the intersection of the Z-axis and the X-axis illustrated in FIG. 11A) and the horizon line H is two-fifths (0.4) of the distance from the station point SP and the edge of the field of view (e.g., the edge of the image illustrated in FIG. 11A). The area of the circular ring bound by the horizon line H and the edge of the field of view is equal to $\pi*(r^2-(0.4r)^2)$, where r is equal to the radius to the edge of the field of view. Thus, the area of the image captured that is below the horizon line (i.e., the area of the circular ring bound by the horizon line H and the edge of the field of view) measured as a percentage of the total area captured, is equal to $(\pi*(r^2-(0.4r)^2))/(\pi*r^2)$, or approximately 84 percent of the total area captured.

FIG. 11B illustrates an anamorphic image that might be captured using a hypothetical fisheye lens. Although the image captured using a fisheye lens may span approximately 110 zenith degrees (e.g., have an approximately 220 degree vertical field of view) the distance between the station point SP (e.g., the intersection of the z-axis and the x-axis) and the horizon line H is approximately four-fifths (0.8) of the distance from the station point SP and the edge of the field of view. The area of the circular ring bound by the horizon line H and the edge of the field of view is equal to $\pi*(r^2-(0.8r)^2)$, where r is equal to the radius to the edge of the field of view. Thus, as a percentage of the total area captured, the area of the circular ring bound by the horizon line H and the edge of the field of view is equal to $(\pi*(r^2-(0.8r)^2))/(\pi*r^2)$, or approximately 36 percent of the total area captured.

Thus, an anamorphic image captured at the viewing plane VP1 (FIG. 7) or the viewing plane VP2 (FIG. 1) would contain more image detail between the horizon line H and the edge of the field of view as compared to an image captured using a fisheye lens (e.g., approximately 84 percent of the total area captured compared to approximately 36 percent using a hypothetical fisheye lens). In other words, a fisheye lens would capture more of the sky than an image captured at the viewing plane VP1 (FIG. 7) or the viewing plane VP2 (FIG. 1). Comparing FIG. 11B to FIG. 11A illustrates that an image captured using the hypothetical fisheye lens would be more distorted due to the additional image compression between the horizon line H and the edge of the field of view.

While the anamorphic image may be captured using the refractive lens of FIG. 1 or reflective lens of FIG. 7, the anamorphic image may also be derived from non-anamorphic images (e.g., a two-dimensional or three-dimensional image), as will be described with more reference to FIGS. 12 through 15.

Figure 12A:
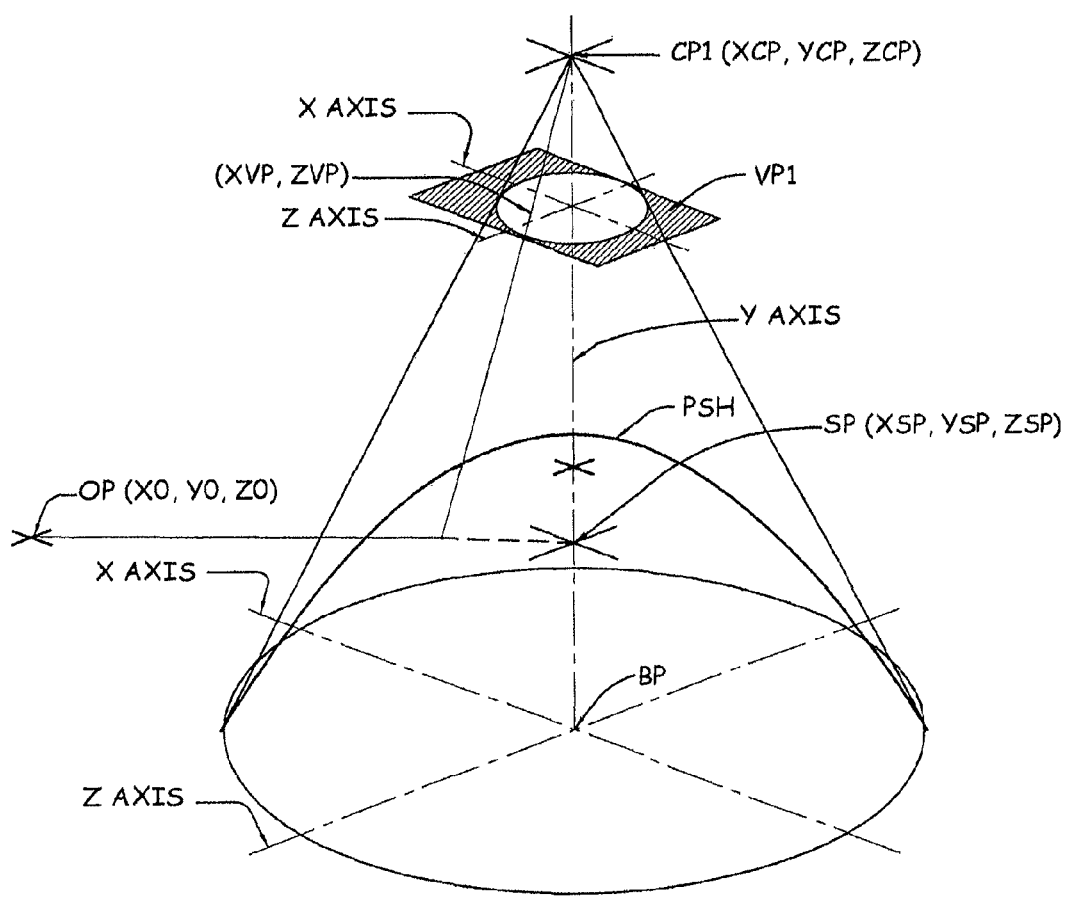
FIG. 12A is a graphical representation of converting images captured without using the refractive lens of FIG. 1 or reflective lens of FIG. 7 (e.g., an image captured using a traditional camera) to a format suitable for viewing on the display of FIG. 10A, according to one embodiment.

FIG. 12A graphically represents converting images captured without using the refractive lens of FIG. 1 or reflective lens of FIG. 7 (e.g., an image captured using a traditional camera) to a format suitable for viewing on the viewing surface PSH of FIG. 10A. In other words, FIG. 12A graphically represents converting $X_O,Y_O,Z_O$ coordinates to $X_{VP}, Z_{VP}$ coordinates (see FIG. 11) as viewed from the camera point CP1. This format can then be displayed as described with reference to FIGS. 10A, 16, 17, and 18.

Figure 12B:
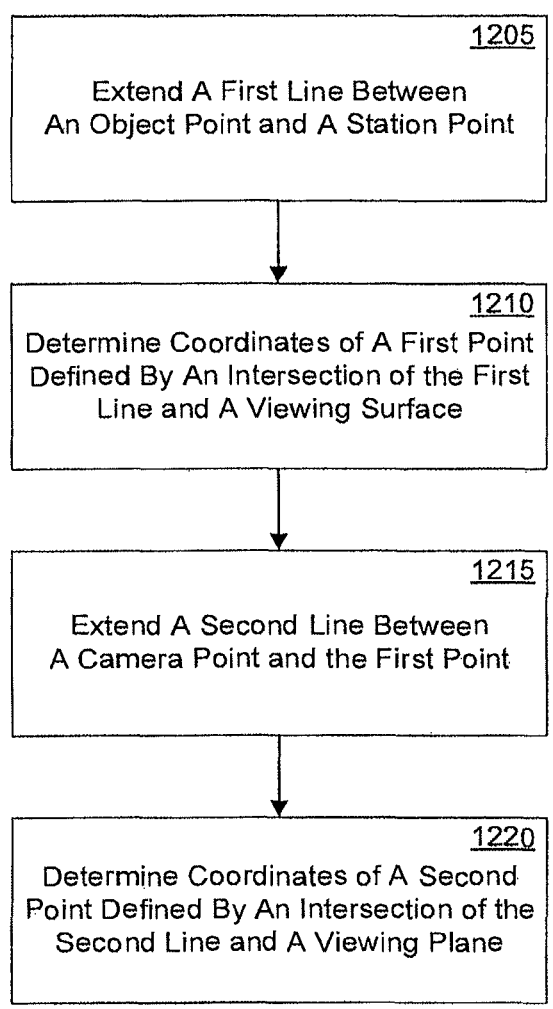
FIG. 12B is a flowchart illustrating a method of converting images captured without using the refractive lens of FIG. 1 or reflective lens of FIG. 7 (e.g., an image captured using a traditional camera) to a format suitable for viewing on the display of FIG. 10, according to one embodiment.

FIG. 12B is a flowchart illustrating a method 1200 of converting images captured without using the refractive lens of FIG. 1 or reflective lens of FIG. 7 (e.g., an image captured using a traditional camera) to a format suitable for viewing on the display of FIG. 10, according to one embodiment. Thus, the method 1200 can be used to convert a three-dimensional point in space (e.g., the object point OP having coordinates $X_O,Y_O,Z_O$) to a point located on the viewing plane VP1 (e.g., a point having coordinates $X_{VP}, Z_{VP}$). At step 1205, a line is extended between the object point OP having coordinates $X_O,Y_O,Z_O$ and the station point SP having coordinates $X_{SP},Y_{SP},Z_{SP}$. At step 1210, the coordinates of a point on the viewing surface PSH or picture plane PP having coordinates $X_{PP},Y_{PP},Z_{PP}$ defined by an intersection of the line extending between the object point OP and the station point SP and the viewing surface PSH are determined. At step 1215, a line is extended between the camera point CP1 having coordinates $X_{OP},Y_{OP},Z_{OP}$ and the point on the viewing surface PSH having coordinates $X_{PP}, Y_{PP},Z_{PP}$. At step 1220, the coordinates of a point on the viewing plane VP1 or camera screen CS having coordinates $X_{VP}, Z_{VP}$ defined by an intersection of the line extending between the camera point CP1 and the point on the viewing surface PSH are determined.

According to one embodiment, Equation 28 through Equation 78, can be used to convert $X_O,Y_O,Z_O$ coordinates to $X_{VP}, Z_{VP}$ coordinates as viewed from the camera point CP1, to be projected on an immersion vision display screen. As shown in FIG. 12A, a base point BP having a radius BR and coordinates $X_B,Y_B,Z_B$ lies directly below the apex of the picture plane PP. Equation 28 through Equation 78 assume that the base point BP has coordinates 0,0,0 and that the viewer is located at the station point SP. The object point OP having coordinates $X_O,Y_O,Z_O$ or $X_{OP},Y_{OP},Z_{OP}$ is located outside the viewing surface PSH or picture plane PP with reference to the base point BP. The location of the point on the picture plane PP having coordinates $X_{PP},Y_{PP},Z_{PP}$ can be determined on a vertical plane defined by the object point OP and station point SP. Because the picture plane PP is symmetric about the Y-axis, the point on the picture plane PP having coordinates $X_{PP},Y_{PP},Z_{PP}$ can be rotated about the Y-axis to define all points on the picture plane PP in the vertical plane defined by the object point OP and station point SP.

Initially, an equation for the line defining the picture plane PP is determined. The origin ray angle ORA, which is the angle from horizontal of the origin ray OR, as measured about the point $X_{PP},Y_{PP},Z_{PP}$ is determined from Equation 28 and Equation 29.

$$ORA = \mathrm{ATan}\left(\frac{\Delta Y}{\Delta X}\right) \qquad \text{Equation 28}$$

$$ORA = \text{ATan}\left(\frac{Y_{sp} - Y_{op}}{X_{op} - X_{sp}}\right) \quad \text{Equation 29}$$

A reflective ray angle RRA, where the reflective ray angle RRA is the angle from vertical of the reflective ray RR as measured about the point $X_{PP}, Y_{PP}, Z_{PP}$, can be determined given the locations of the station point SP having coordinates $X_{SP}, Y_{SP}, Z_{SP}$ and the camera point CP having coordinates $X_{CP}, Y_{CP}, Z_{CP}$ from Equation 30 and Equation 31.

$$RRA = \text{ATan}\left(\frac{\Delta Y}{\Delta X}\right) \quad \text{Equation 30}$$

$$RRA = \text{ATan}\left(\frac{X_{pp} - X_{cp}}{Y_{pp} - Y_{cp}}\right) \quad \text{Equation 31}$$

A mirrored angle MA, where the mirrored angle MA is the angle of the origin ray OR to the reflective ray RR measured about the intersection point of the origin ray OR to the viewing surface PSH as measured about the point $X_{PP}, Y_{PP}, Z_{PP}$, can be determined from Equation 32.

$$MA = 90° + RRA - ORA \quad \text{Equation 32}$$

The origin to normal angle ONA, where the origin to normal angle ONA is the angle from the origin ray OR to the normal line NL (to the picture plane PP at intersection point $X_{PP}, Y_{PP}, Z_{PP}$) as measured about the point $X_{PP}, Y_{PP}, Z_{PP}$ can be determined from Equation 33.

$$ONA = \frac{MA}{2} \quad \text{Equation 33}$$

A normal angle NA, where the normal angle NA is the angle from the normal line (N) to the horizontal can be determined from Equation 34.

$$NA = ONA - ORA \quad \text{Equation 34}$$

A tangent angle TA, where the tangent angle TA is the angle measured from horizontal to the tangent line at the viewing surface PSH as measured about the point $X_{PP}, Y_{PP}, Z_{PP}$ can be determined from Equation 35.

$$TA = 90° - NA \quad \text{Equation 35}$$

Combining the Equations:

$$TA = 90° - (ONA - ORA) \quad \text{Equation 36}$$

$$TA = 90° - \left(\frac{MA}{2} - \text{ATan}\left(\frac{Y_{sp} - Y_{op}}{X_{op} - X_{sp}}\right)\right) \quad \text{Equation 37}$$

$$TA = 90° - \left(\frac{90° + RRA - ORA}{2} - \text{ATan}\left(\frac{Y_{sp} - Y_{op}}{X_{op} - X_{sp}}\right)\right) \quad \text{Equation 38}$$

Simplifying the Equations:

$$TA = 90° - \left(\frac{90°}{2} + \frac{RRA}{2} - \frac{ORA}{2} - \text{ATan}\left(\frac{Y_{sp} - Y_{op}}{X_{op} - X_{sp}}\right)\right) \quad \text{Equation 39}$$

$$TA = 90° - \frac{90°}{2} - \frac{RRA}{2} + \frac{ORA}{2} + \text{ATan}\left(\frac{Y_{sp} - Y_{op}}{X_{op} - X_{sp}}\right) \quad \text{Equation 40}$$

Combining the Equations:

$$TA = 90° - \frac{90°}{2} - \frac{\text{ATan}\left(\frac{X_p p - X_{cp}}{Y_{pp} - Y_{cp}}\right)}{2} + \frac{\text{ATan}\left(\frac{Y_{sp} - Y_{op}}{X_{op} - X_s p}\right)}{2} + \text{ATan}\left(\frac{Y_{sp} - Y_{op}}{X_{op} - X_{sp}}\right) \quad \text{Equation 41}$$

$$TA = \frac{90°}{2} - \frac{\text{ATan}\left(\frac{X_{pp} - X_{cp}}{Y_{pp} - Y_{cp}}\right)}{2} + \frac{3 \times \text{ATan}\left(\frac{Y_{sp} - Y_{op}}{X_{op} - X_{sp}}\right)}{2} \quad \text{Equation 42}$$

$$TA = \frac{90° - \text{ATan}\left(\frac{X_{pp} - X_{cp}}{Y_{pp} - Y_{cp}}\right) + 3 \times \text{ATan}\left(\frac{Y_{sp} - Y_{op}}{X_{op} - X_{sp}}\right)}{2} \quad \text{Equation 43}$$

Equation 44 and Equation 45 can be used to determine an Equation of a line tangent to the viewing surface PSH at point $X_{PP}, Y_{PP}, Z_{PP}$ in an elevation view (e.g., X and Y coordinates only), along the vertical plane defined by the station point and the object point.

$$Y = MX + b \quad \text{Equation 44}$$

$$Ypp = \text{Tan}(TA) \times Xpp + b \quad \text{Equation 45}$$

Where b is the vertical offset between the base point BP of the dome to the origin point OP of the coordinate system (e.g., assuming that the base point BP and origin point OP of the coordinate system are the same).

Combining the Equations:

$$Y_{pp} = \quad \text{Equation 46}$$
$$\text{Tan}\left(\frac{90° - \text{ATan}\left(\frac{X_{pp} - X_{cp}}{Y_{pp} - Y_{cp}}\right) + 3 \times \text{ATan}\left(\frac{Y_{sp} - Y_{op}}{X_{op} - X_{sp}}\right)}{2}\right) \times X_{pp} + 0$$

Simplifying the Equations:

$$Y_{pp} = \quad \text{Equation 47}$$
$$\text{Tan}\left(45° - \frac{1}{2}\text{ATan}\left(\frac{X_{pp} - X_{cp}}{Y_{pp} - Y_{cp}}\right) + \frac{3}{2} \times \text{ATan}\left(\frac{Y_{sp} - Y_{op}}{X_{op} - X_{sp}}\right)\right) \times X_{pp}$$

The Equation for a line from the station point SP to the object point OP can be determined by calculating a horizontal length H of the line from the station point SP to the object point OP using Equation 48.

$$H = \sqrt{\Delta X^2 + \Delta Y^2} \quad \text{Equation 48}$$

Combining the Equations:

$$H = \sqrt{(X_{op} - X_{sp})^2 + (Z_{op} - Z_{sp})^2} \quad \text{Equation 49}$$

The vertical difference between the station point SP and the object point OP can be determined from Equation 50.

$$\Delta Y = Y_{op} - Y_{sp} \quad \text{Equation 50}$$

The slope SL of the line between the station point SP and the object point OP can be determined from Equation 51 and Equation 52.

$$SL = \frac{\Delta Y}{\Delta X} \qquad \text{Equation 51}$$

$$SL = \frac{Y_{op} - Y_{sp}}{H} \qquad \text{Equation 52}$$

Combining the Equations:

$$SL = \frac{Y_{op} - Y_{sp}}{\sqrt{(X_{op} - X_{sp})^2 + (Z_{op} - Z_{sp})^2}} \qquad \text{Equation 53}$$

The Equation for the line from the station point SP to the object point OP can be determined from Equation 54 and Equation 55.

$$Y = MX + b \qquad \text{Equation 54}$$

$$Y_{pp} = SL \times X_{pp} + b \qquad \text{Equation 55}$$

where b is the vertical offset between the base point BP of the viewing surface PSH to the origin point OP of the coordinate system (e.g., assuming that the base point BP and origin point OP of the coordinate system are the same).

Combining the Equations:

$$Y_{pp} = \frac{Y_{op} - Y_{sp}}{\sqrt{(X_{op} - X_{sp})^2 + (Z_{op} - Z_{sp})^2}} \times X_{pp} + 0 \qquad \text{Equation 56}$$

$$Y_{pp} = X_{pp} \times \frac{Y_{op} - Y_{sp}}{\sqrt{(X_{op} - X_{sp})^2 + (Z_{op} - Z_{sp})^2}} \qquad \text{Equation 57}$$

To determine where the equations for the line of the picture plane PP and the line from the object point OP and the station point SP intersect, combine and simplify the Equations:

$$Y_{pp} = Y_{pp} \qquad \text{Equation 58}$$

$$\text{Tan}\left(45° - \frac{1}{2}\text{ATan}\left(\frac{X_{pp} - X_{cp}}{Y_{pp} - Y_{cp}}\right) + \frac{3}{2} \times \text{ATan}\left(\frac{Y_{sp} - Y_{op}}{X_{op} - X_{sp}}\right)\right) \times \qquad \text{Equation 59}$$
$$X_{pp} = X_{pp} \times \frac{Y_{op} - Y_{sp}}{\sqrt{(X_{op} - X_{sp})^2 + (Z_{op} - Z_{sp})^2}}$$

$$\text{Tan}\left(45° - \frac{1}{2}\text{ATan}\left(\frac{X_{pp} - X_{cp}}{Y_{pp} - Y_{cp}}\right) + \frac{3}{2} \times \text{ATan}\left(\frac{Y_{sp} - Y_{op}}{X_{op} - X_{sp}}\right)\right) = \qquad \text{Equation 60}$$
$$\frac{Y_{op} - Y_{sp}}{\sqrt{(X_{op} - X_{sp})^2 + (Z_{op} - Z_{sp})^2}}$$

$$45° - \frac{1}{2}\text{ATan}\left(\frac{X_{pp} - X_{cp}}{Y_{pp} - Y_{cp}}\right) + \frac{3}{2} \times \text{ATan}\left(\frac{Y_{sp} - Y_{op}}{X_{op} - X_{sp}}\right) = \qquad \text{Equation 61}$$
$$\text{ATan}\left(\frac{Y_{op} - Y_{sp}}{\sqrt{(X_{op} - X_{sp})^2 + (Z_{op} - Z_{sp})^2}}\right)$$

$$\frac{1}{2}\text{ATan}\left(\frac{X_{pp} - X_{cp}}{Y_{pp} - Y_{cp}}\right) + \frac{3}{2} \times \text{ATan}\left(\frac{Y_{sp} - Y_{op}}{X_{op} - X_{sp}}\right) = \qquad \text{Equation 62}$$
$$\text{ATan}\left(\frac{Y_{op} - Y_{sp}}{\sqrt{(X_{op} - X_{sp})^2 + (Z_{op} - Z_{sp})^2}}\right) - 45°$$

$$\frac{1}{2}\text{ATan}\left(\frac{X_{pp} - X_{cp}}{Y_{pp} - Y_{cp}}\right) + \frac{3}{2} \times \text{ATan}\left(\frac{Y_{sp} - Y_{op}}{X_{op} - X_{sp}}\right) = \qquad \text{Equation 63}$$
$$\text{ATan}\left(\frac{Y_{op} - Y_{sp}}{\sqrt{(X_{op} - X_{sp})^2 + (Z_{op} - Z_{sp})^2}}\right) - 45°$$

$$\text{ATan}\left(\frac{X_{pp} - X_{cp}}{Y_{pp} - Y_{cp}}\right) + 3 \times \text{ATan}\left(\frac{Y_{sp} - Y_{op}}{X_{op} - X_{sp}}\right) = \qquad \text{Equation 64}$$
$$2 \times \text{ATan}\left(\frac{Y_{op} - Y_{sp}}{\sqrt{(X_{op} - X_{sp})^2 + (Z_{op} - Z_{sp})^2}}\right) - 90°$$

$$\text{ATan}\left(\frac{X_{pp} - X_{cp}}{Y_{pp} - Y_{cp}}\right) = \qquad \text{Equation 65}$$
$$2 \times \text{ATan}\left(\frac{Y_{op} - Y_{sp}}{\sqrt{(X_{op} - X_{sp})^2 + (Z_{op} - Z_{sp})^2}}\right) -$$
$$90° - 3 \times \text{ATan}\left(\frac{Y_{sp} - Y_{op}}{X_{op} - X_{sp}}\right)$$

$$\frac{X_{pp} - X_{cp}}{Y_{pp} - Y_{cp}} = \qquad \text{Equation 66}$$
$$\text{Tan}\left(2 \times \text{ATan}\left(\frac{Y_{op} - Y_{sp}}{\sqrt{(X_{op} - X_{sp})^2 + (Z_{op} - Z_{sp})^2}}\right) - 90° - 3 \times \text{ATan}\left(\frac{Y_{sp} - Y_{op}}{X_{op} - X_{sp}}\right)\right)$$

$$X_{pp} - X_{cp} = (Y_{pp} - Y_{cp}) \times \qquad \text{Equation 67}$$
$$\text{Tan}\left(2 \times \text{ATan}\left(\frac{Y_{op} - Y_{sp}}{\sqrt{(X_{op} - X_{sp})^2 + (Z_{op} - Z_{sp})^2}}\right) -$$
$$90° - 3 \times \text{ATan}\left(\frac{Y_{sp} - Y_{op}}{X_{op} - X_{sp}}\right)\right)$$

$$X_{pp} = (Y_{pp} - Y_{cp}) \times \qquad \text{Equation 68}$$
$$\text{Tan}\left(2 \times \text{ATan}\left(\frac{Y_{op} - Y_{sp}}{\sqrt{(X_{op} - X_{sp})^2 + (Z_{op} - Z_{sp})^2}}\right) -$$
$$90° - 3 \times \text{ATan}\left(\frac{Y_{sp} - Y_{op}}{X_{op} - X_{sp}}\right)\right) + X_{cp}$$

Next a line can be extended from intersection point on the picture plane PP as viewed from above. When looking down at the X-Z plane, the directional angle DA, measured from the X-axis around the Y-axis, can be determined from Equation 69 and Equation 70.

$$DA = \text{ATan}\frac{\Delta Z}{\Delta X} \qquad \text{Equation 69}$$

$$DA = \text{ATan}\frac{Z_{op} - Z_{sp}}{X_{op} - X_{sp}} \qquad \text{Equation 70}$$

The horizontal length R of the previously determined line from the station point SP to the picture plane PP can be determined from Equation 71.

$$R = X_{pp} \qquad \text{Equation 71}$$

The plot on the viewing plane VP1 can be determined Equation 72, Equation 73, and Equation 74 using the directional angle DA and radius R from the center of the camera screen SC to the plot of $X_{VP}$, $Z_{VP}$.

$$\frac{X_{vp}}{R} = \text{Cos}(DA) \qquad \text{Equation 72}$$

$$X_{vp} = R \times \text{Cos}(DA) \qquad \text{Equation 73}$$

$$Z_{vp} = R \times \text{Sin}(DA) \qquad \text{Equation 74}$$

Combining and simplifying the Equations:

$$X_{vp} = X_{pp} \times \text{Cos}\left(\text{ATan}\frac{Z_{op} - Z_{sp}}{X_{op} - X_{sp}}\right) \qquad \text{Equation 75}$$

$$Xvp = [(Ypp - Ycp) \times$$
$$\text{Tan}\left(2 \times \text{ATan}\left(\frac{Yop - Ysp}{\sqrt{(Xop - Xsp)^2 + (Zop - Zsp)^2}}\right) - \right.$$
$$\left. 90° - 3 \times \text{ATan}\left(\frac{Ysp - Yop}{Xop - Xsp}\right)\right) +$$
$$Xcp] \times \text{Cos}\left(\text{ATan}\frac{Zop - Zsp}{Xop - Xsp}\right) \qquad \text{Equation 76}$$

$$Z_{vp} = X_{pp} \times \text{Sin}\left(\text{ATan}\frac{Z_{op} - Z_{sp}}{X_{op} - X_{sp}}\right) \qquad \text{Equation 77}$$

$$Zvp = [(Ypp - Ycp) \times$$
$$\text{Tan}\left(2 \times \text{ATan}\left(\frac{Yop - Ysp}{\sqrt{(Xop - Xsp)^2 + (Zop - Zsp)^2}}\right) - \right.$$
$$\left. 90° - 3 \times \text{ATan}\left(\frac{Ysp - Yop}{Xop - Xsp}\right)\right) +$$
$$Xcp] \times \text{Sin}\left(\text{ATan}\frac{Zop - Zsp}{Xop - Xsp}\right) \qquad \text{Equation 78}$$

Figure 13:
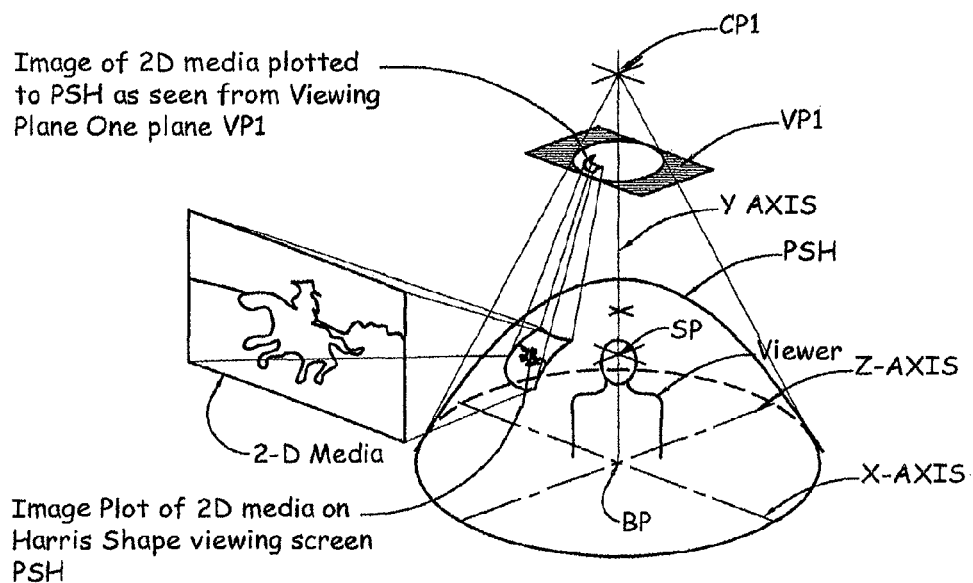
FIG. 13 illustrates an example of converting an image captured using a traditional camera to a format suitable for viewing on the display of FIG. 10A.

FIG. 13 is a graphical illustration of converting an image captured using a traditional camera (e.g., movie or television images) to a format suitable for viewing on the immersion vision screen using Equation 28 through Equation 78, according to one embodiment. For example, a rectangular flat plane can be defined in a three-dimensional immersive environment and the X-Y coordinates of the plane, as well as the color and intensity characteristics of the image or movie, can be assigned to correlating points on the flat plane with a sufficient number of points to achieve the desired image resolution. Each of the points defined on the plane in immersive space is then plotted to the viewing plane VP1 in a manner similar to that described with reference to FIGS. 12A and 12B. Thus, when the anamorphic image of the movie or still image is displayed on the viewing surface PSH, the viewer perceives a two-dimensional rectangular image as viewed from the station point SP.

Figure 14:
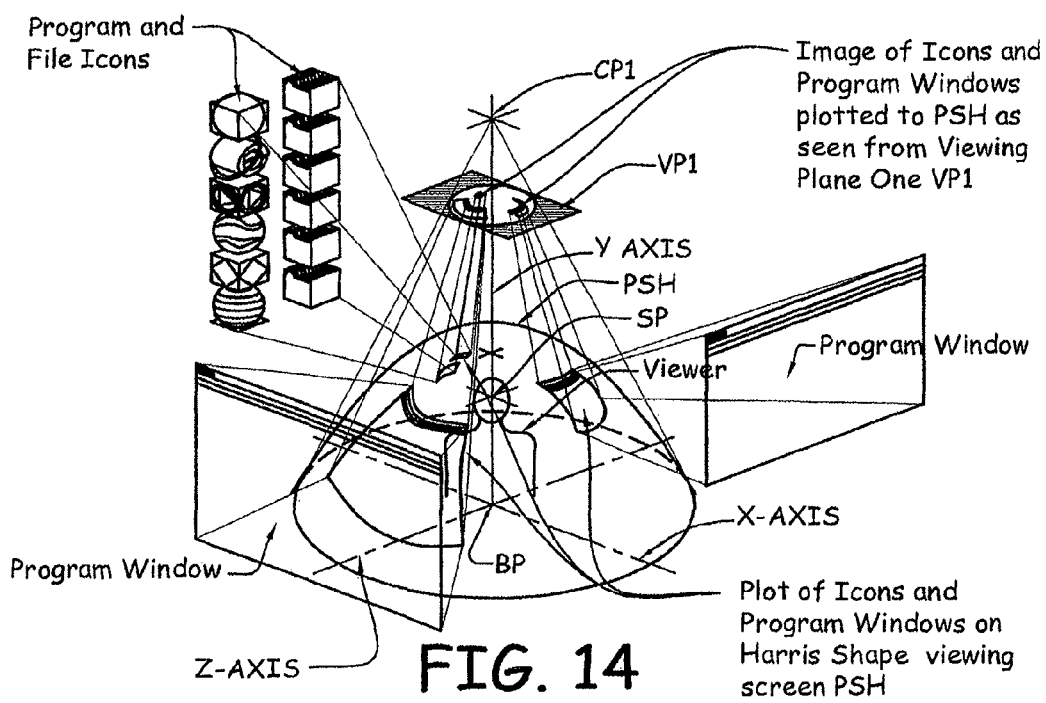
FIG. 14 illustrates an example of converting a traditional graphical user interface display for a computer to a format suitable for viewing on the display of FIG. 10A.

FIG. 14 is a graphical illustration of converting a computer graphics image, such as a traditional graphical user interface object to a format suitable for viewing on the immersion vision screen using Equation 28 through Equation 78, according to one embodiment. In a manner similar to that described with reference to FIGS. 12A and 12B, three-dimensional constructs depicting program icons, folders, files and program windows are defined and then the parts of the construct visible from the station point SP are plotted to the viewing surface PSH and then to the viewing plane VP1. For example, the window or icon of a piece of software may be converted so that the immersion vision screen can be used as an expanded desktop (e.g., the windows float about the user). When used to display websites, the immersion vision system helps create three-dimensional panoramic environments that bring a new level of interaction and depth of detail to the internet experience.

Figure 15:
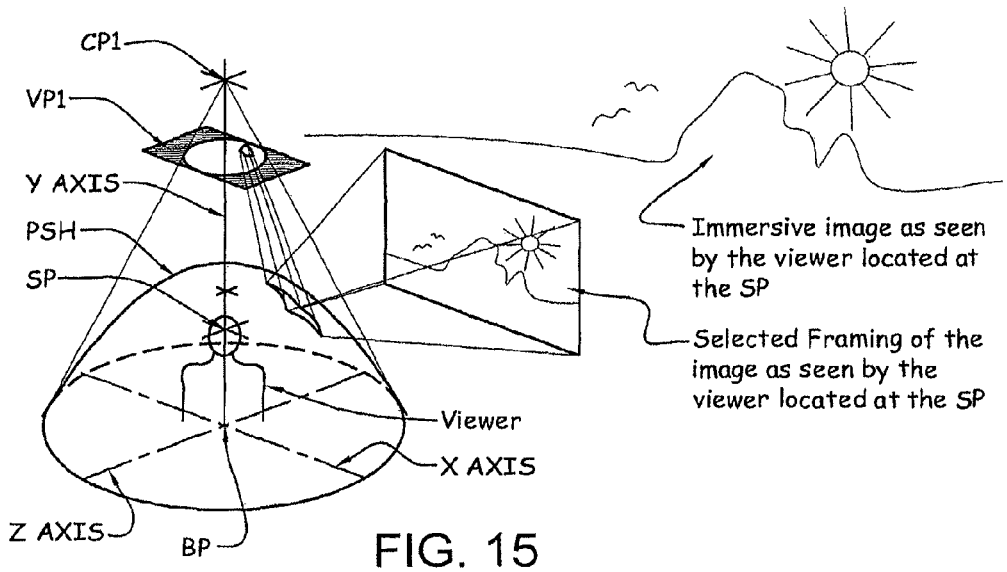
FIG. 15 illustrates an example of converting an image suitable for viewing on the display of FIG. 10A to a format suitable for printing as a photograph having a traditional aspect ratio.

FIG. 15 is a graphical illustration of converting an image suitable for viewing on the immersion vision screen to a format suitable for printing as a photograph having a traditional aspect ratio using Equation 28 through Equation 78, according to one embodiment. For example, the user may select a partial image from within the immersion vision panoramic format (e.g., by highlighting or framing a desired image as seen by the viewer located at the station point SP) so that the desired image can be printed as a flat rectangular photograph.

In order to select an area of the image displayed around the viewer to define the area for printing, a rectangle within the field of view as observed from the station point SP is defined. The following example provides a mathematical analysis of the various image manipulations. This example assumes that the viewer is viewing the image from the station point SP inside the lens of FIG. 7 on the reflective surface as they would view the image on the Harris shaped display surface at a normal scale. For this example, the distance between the base point BP and the furthest extent of the surface PSH is approximately three inches. The distance from the base point BP of the refractive lens to the camera point CP1 is approximately nine inches. The angle from the horizon line to the edge of the field of view of the lens is 30 degrees, which makes the distance from the base point BP to the station point SP approximately 1.7321 inches. The center point of the coordinate system (0,0) is located at the station point SP. The center point of the rectangle is located on a sphere having a radius of approximately four inches from the station point SP. For the purpose of simplicity the direction of viewing is along the direction of the z-axis and level with the horizon line and the selection rectangle is located within the x-y plane.

All rectangles have a center point of the rectangle located on the surface of an imaginary sphere of a fixed radius about the station point SP where this fixed radius is outside the exterior surface of the reflective lens, and the rectangle is perpendicular to the line from the station point SP to the center point of the rectangle.

With reference to FIG. 13, the viewer at the station point SP perceives a rectangle framing a portion of the anamorphic image projected on the viewing screen surface PSH. The rectangle is defined as three dimensional points having coordinates defining the center point and the four corners of the selection rectangle. In this example, the center point is located at coordinates (4,0,0). If the selection rectangle is two inches wide (in the x-direction) and 1.6 inches tall (in the y-direction), the four corners of the selection rectangle are located at coordinates (−1,0.8,0), (1,0.8,0), (1,−0.8,0) and (−1,−0.8,0). The size and shape of the selection rectangle can be varied by adjusting the coordinate values of the corners of the selection rectangle.

With reference to FIG. 12 and Equation 68, the coordinates of the corners of the selection rectangle as displayed on the viewing plane VP1 can be determined by solving Equation 68 for the surface of the rectangle. For example, entering the hypothetical data (e.g., $Y_{cp}$=7.268; $Y_{sp}=X_{sp}=Z_{sp}=X_{cp}=0$; $X_{op}$, $Y_{op}$, and $Z_{op}$ varies for each point) into Equation 68 yields the $X_{pp}$ coordinate for the center point of the selection rectangle as well as the $X_{pp}$ coordinates of the four corners of the selection rectangle plotted to the surface PSH, as shown in Equation 79.

$$X_{pp} = \text{Equation 79}$$
$$(Y_{pp} - 7.268) \times \text{Tan}\left(2 \times \text{ATan}\left(\frac{Y_{op} - 0}{\sqrt{(X_{op} - 0)^2 + (Z_{op} - 0)^2}}\right)\right) -$$
$$90° - 3 \times \text{ATan}\left(\frac{0 - Y_{op}}{X_{op} - 0}\right) + 0$$

The object points for the selection rectangle ($X_{op}$, $Y_{op}$, $Z_{op}$) can be set for this example so that the center point has coordinates (4,0,0) and the corner points have coordinates (−1,0.8,0), (1,0.8,0), (1,−0.8,0) and (−1,−0.8,0). Because the variable $X_{pp}$ in Equation 79 is the same variable as $X_{PSH}$ shown in Equation 80, Equation 79 can be combined with Equation 16 to yield Equation 80 which states the value of $Y_{pp}$ as a function of the known object point values ($X_{op}$, $Y_{op}$, $Z_{op}$) for the selection rectangle in this example.

$$Xpp = (Ypp - 7.268) \times \text{Equation 80}$$
$$\text{Tan}\left(2 \times \text{ATan}\left(\frac{0}{\sqrt{(4)_2 + (0)_2}}\right) - 90° - 3 \times \text{ATan}\left(\frac{-0}{4}\right)\right)$$

Equation 80 uses the center point of the selection rectangle as an example of calculating the $X_{pp}$ coordinate from the coordinates of the object points using Equation 16. In this example, the $X_{pp}$ value of the center point of the selection rectangle can be determined from Equation 16 to be $X_{pp}$=22. Then, Equation 80 can be used with the data for the object point coordinates of each of the respective four corners of the selection rectangle to calculate the $X_{pp}$ for each of the corners.

Next, a resolution may be defined by selecting the number of pixels in the rectangle. Then image characteristics may be assigned to the pixels in the rectangle. In addition, the color and intensity characteristics of the image or movie can be assigned to correlating points on the flat plane with a sufficient number of points to achieve the desired image resolution. An image file of pixels of the rectangle can then be stored and printed.

Thus, a digital camera or movie camera using the refractive lens of FIG. 1 or reflective lens of FIG. 7 makes the vision station an ideal setup for viewing photos and editing the immersion vision images in a panoramic format.

Display

Referring now to FIG. 10A, a display according to one embodiment uses the Harris shape for the viewing surface PSH. A projector may be located at point CP and project an image on the viewing surface PSH. The user may then view the image from the station point SP located on the other side of the viewing surface PSH. Alternatively, the viewing surface PSH may be a volatile flat panel display, such as a liquid crystal display (LCD), organic light-emitting diode display (OLED), or light-emitting diode display (LED), or a static flat panel display, such as a polymer stabilized cholesteric liquid crystal display, taking a Harris shape. This may require an algorithm that converts the photo captured using the reflective/refractive lens above to the addressed display. According to another embodiment, the outside surface of the shell is lined with image capture devices that can communicate with the display on the inner surface of the shell. This may allow a projector to be used and may help control the amount of light incident the user's retina.

Figure 10B:
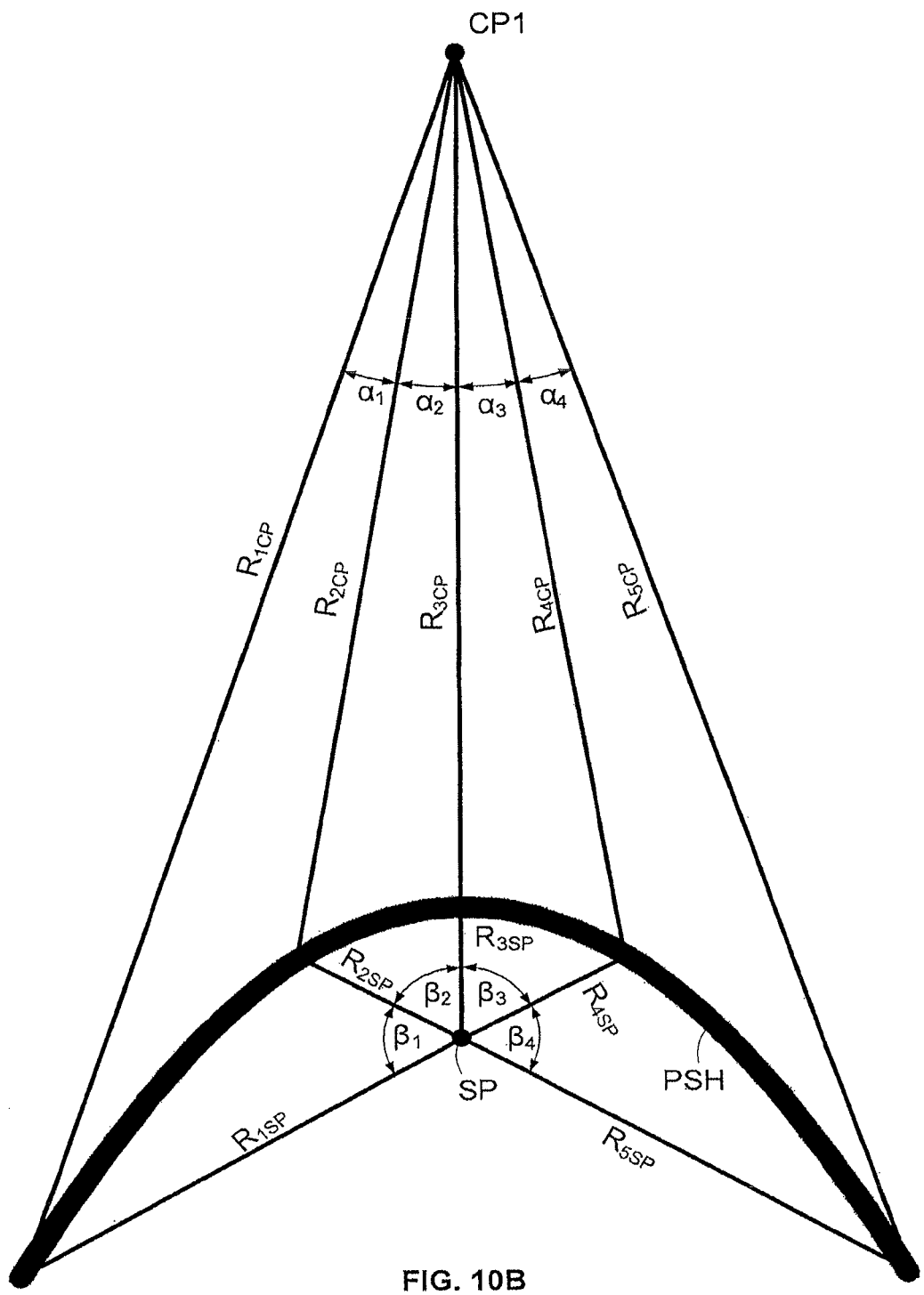
FIG. 10B is a cross-section of the display of FIG. 10A.

FIG. 10B is a cross-section of the viewing surface PSH shown in FIG. 10A. As shown in FIG. 10B, the viewing or station point SP is located on the concave side of the viewing surface PSH and the focal or camera point CP1 is located on the convex side of the viewing surface PSH. According to one embodiment, the viewing surface PSH takes the same shape as the reflective surface PSH described with reference to the lens of FIG. 7. Thus, if the viewing surface PSH was reflective, all light rays passing through the viewing surface PSH and directed toward the viewing point SP would reflect off the viewing surface PSH and intersect at the focal point CP1. In other words, if the viewing surface PSH was reflective, any two rays (e.g., rays $R_{1SP}$ through $R_{5SP}$) passing through the viewing surface PSH toward the viewing point SP separated by a viewing angle β would reflect off the viewing surface PSH and intersect at the focal point CP1 separated by an angle α, and the angle α would be the same regardless of direction from which the two rays separated by the viewing angle β originate. The viewing surface PSH may include a set of points defined by the intersections of rays $R_{1SP}$ through $R_{5SP}$ emanating from the viewing point SP and corresponding rays $R_{1CP}$ through $R_{5CP}$ emanating from the focal point CP1. While only ten rays are show in FIG. 10B, it should be recognized that the viewing surface PSH may include a set of points defined by the intersections of more than ten rays. The rays $R_{1CP}$ through $R_{5CP}$ are separated by angles $α_1$ through $α_4$, where $α_1=α_2=α_3=α_4$. Likewise, the rays $R_{1SP}$ through $R_{5SP}$ are separated by angles $β_1$ through $β_4$, where $β_1=β_2=β_3=β_4$. The angles α and β do not need to be equal. According to one embodiment, $β_1$ through $β_4$ together define the field of view of the viewing surface PSH and add to approximately 240 degrees (e.g., $β_1$ and $β_2$ add to approximately 120 zenith degrees and $β_3$ and $β_4$ add to approximately 120 zenith degrees).

The displays or immersion vision screens can take may sizes. For example a work station display (FIG. 16) may be suitable for one or two viewers, a home theatre display (FIG. 17) may be suitable for a small group of viewers, and a movie theatre display (FIG. 18) may be suitable for a large group of viewers.

Figure 16:
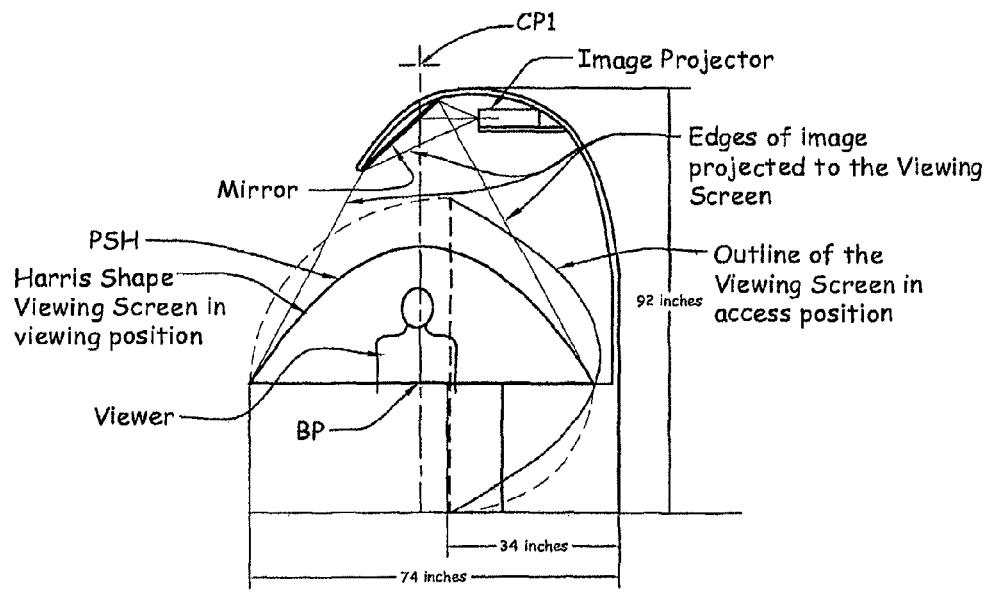
FIG. 16 is a perspective view of a station display (e.g., computer or workstation display) according to one embodiment.

With reference to FIG. 16, the work station display may be used as an individual computer display or display workstation. According to one embodiment, the entire structure measures approximately 7 feet by 7 feet on the floor and measures approximately 7 feet 11 inches high. The viewing screen size may be approximately 6 feet in diameter with a screen height of approximately 2 feet 8 inches. The screen can pivot upward and may be counter-balanced to open and close with ease. The projector may be mounted overhead and can be reflected off a flat mirror downward onto a translucent acrylic shell used as a viewing surface.

The vision station viewing surface or projection screen may be made with a thermo-pneumatically molded clear acrylic sheet. The exterior surface of the screen may then be etched to prepare the surface to receive the projected image. The supporting structure for the screen and projector may be made with welded tube steel covered with sheet metal and wood veneers. In addition, the supporting structure may include pneumatic formwork. The computer may be of standard manufacture with a high level of graphics speed and capability. The projector may be a standard digital projector of high resolution.

Figure 17:
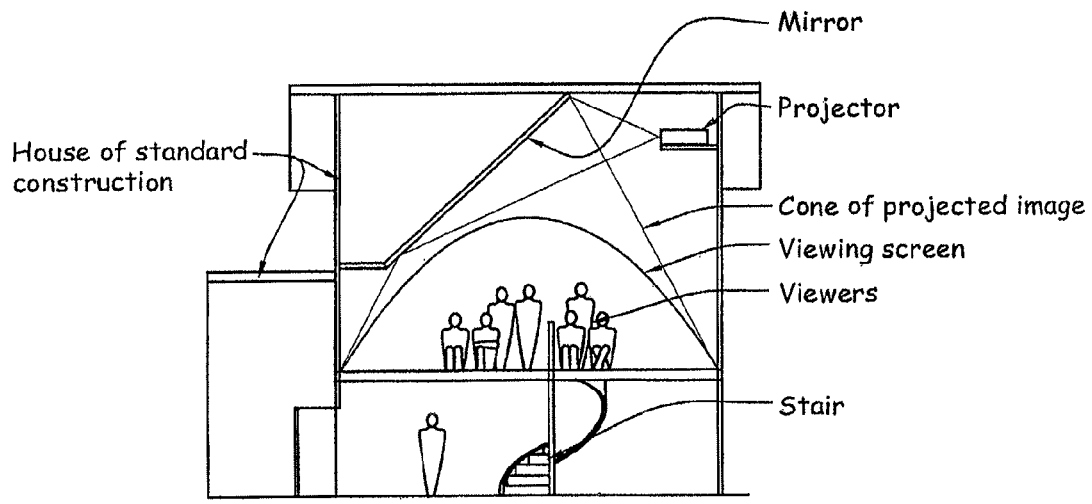
FIG. 17 is a perspective view of a room display (e.g., home theater or conference room) according to one embodiment.

Referring now to FIG. 17, the home theatre display (vision room) is shown that may be used as an entertainment theatre room or as a conference room. The vision room viewing screen may utilize a Harris shape and may be designed for use by three or eight people. Accordingly, the viewing screen size may be, for example, 7 feet to 20 feet in diameter with a screen height ranging from 3 feet to 9 feet. However, other sizes may be used based on the application. The projector may be overhead and project downward onto an acrylic shell used as a viewing surface.

The vision room viewing surface or projection screen may be made with thermo-pneumatically molded clear acrylic sheets. The exterior surface of the screen may then be etched to prepare the surface to receive the projected image. The supporting structure for the screen and projector may be made with welded tube steel covered with sheet metal and wood. The entire screen, projector and computer may be contained within a home or business which may be darkened for better viewing.

Figure 18:
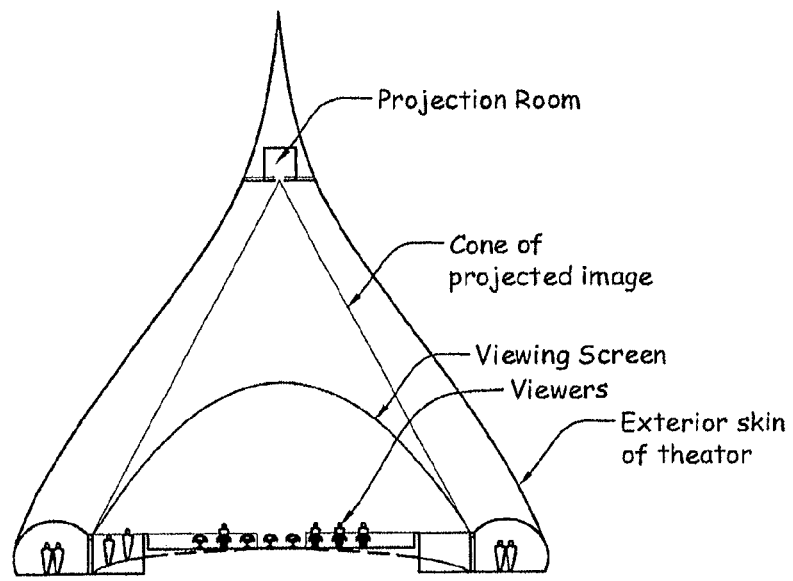
FIG. 18 is a perspective view of a theater display (e.g., movie theater) according to one embodiment.

FIG. 18 shows the movie theatre display (vision theatre) being used a movie or entertainment theatre. The vision theatre viewing screen may utilize a Harris shape. It may be designed for use by 25 to 50 people. Accordingly, the viewing screen size may be 16 feet in diameter with a screen height of approximately 9 feet. However, other sizes may be used based on the application. The projector may be overhead and project downward onto an acrylic shell used as a viewing surface.

Figure 19:
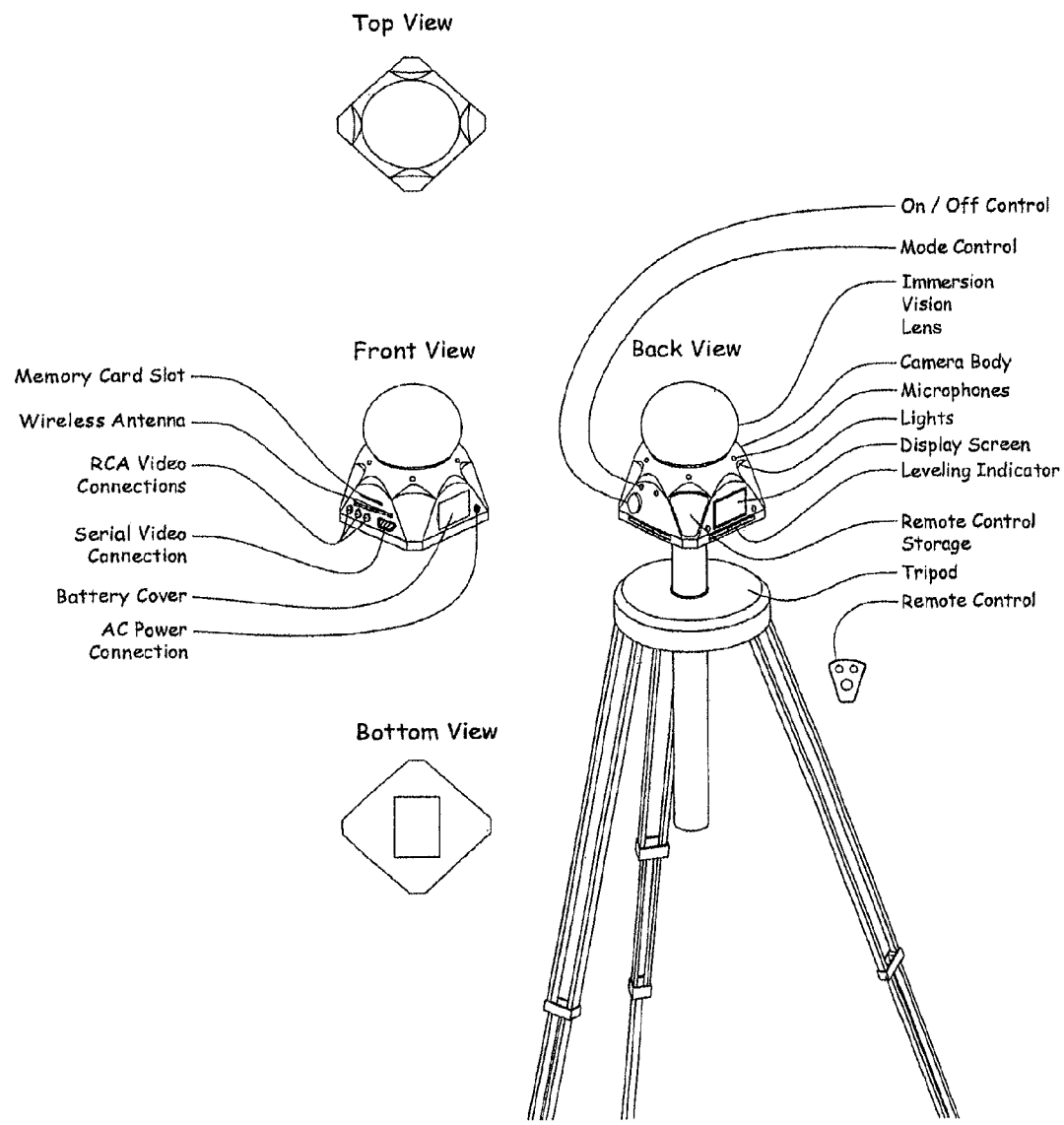
FIG. 19 is a perspective view of a camera utilizing the refractive lens of FIG. 1.
Figure 20:
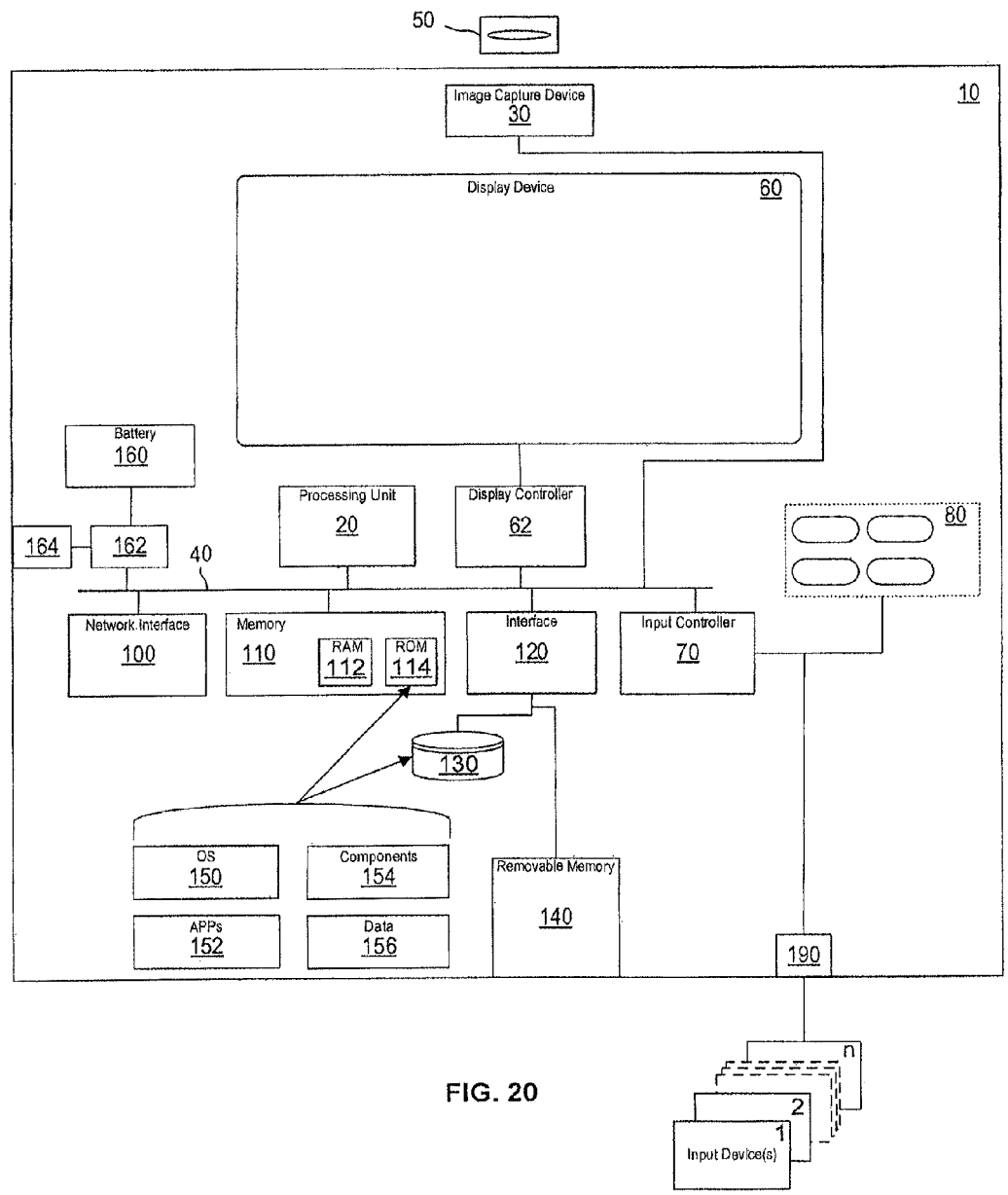
FIG. 20 is a block diagram showing operational components of the camera of FIG. 19, according to one embodiment.

Referring now to FIG. 19, a camera is shown utilizing the refractive lens of FIG. 1. The camera is shown installed on a tripod mount TPM, and may include a leveling indicator, a remote control for hands free camera operation, a camera body having a display screen, lights, microphones, power supply connection and a battery cover. FIG. 20 is a block diagram showing operational components of an example camera 10. The camera 10 includes a processor 20, which may be any commercially available processor or other logic machine capable of executing instructions. An image capture device 30 is communicatively coupled to the processor 20 via a bus 40. A lens 50 (e.g., the refractive lens described with reference to FIG. 1) is provided to focus light on the image capture device 30. The image capture device 30 may comprise a wide range of image sensing devices for converting an optical image (or another wave in the electromagnetic spectrum) into an electrical signal. For example, the image capture device 30 may comprise a charged coupled device (CCD) sensor or complimentary metal oxide semiconductor (CMOS) sensor operable over the visible spectrum. However, the image capture device 30 may take another form and may be operable over other spectrums, such as the infrared spectrum. As previously discussed, the image capture device 30 may also comprise photographic film, film stock, or another device capable of capturing an optical image.

The camera 10 presents data, photographs, menus, prompts, and otherwise communicates with the user via one or more display devices 60, such as a transmissive or reflective liquid crystal display (LCD), organic light-emitting diode (OLED), cathode ray tube (CRT) display, or other suitable micro display. A display controller 62 drives display device 60 and is coupled to bus 40.

The camera 10 may include a standard input controller 70 to receive user input from one or more buttons 80, a pointing device (not shown), or other wired/wireless input devices. Other input devices may include a microphone, touchscreen, touchpad, trackball, or the like. While the input devices may be integrated into the camera 10 and coupled to the processor 20 via the input controller 70, the input devices may also connect via other interfaces, such as a connector 90. The connector 90 may include one or more data interfaces, bus interfaces, wired or wireless network adapters, or modems for transmitting and receiving data. Accordingly, the input controller 70 may include hardware, software, and/or firmware to implement one or more protocols, such as stacked protocols along with corresponding layers. Thus, the connector 90 may function as a serial port (e.g., RS232), a Universal Serial Bus (USB) port, and/or an IR interface. The input controller 80 may also support various wired, wireless, optical, and other communication standards.

A network interface 100 may be provided to communicate with an external network, a computer, or another camera. The network interface 100 may facilitate wired or wireless communication with other devices over a short distance (e.g., Bluetooth™) or nearly unlimited distances (e.g., the Internet). In the case of a wired connection, a data bus may be provided using any protocol, such as IEEE 802.3 (Ethernet), Advanced Technology Attachment (ATA), Personal Computer Memory Card International Association (PCMCIA), and/or USB, for example. A wireless connection may use low or high powered electromagnetic waves to transmit data using any wireless protocol, such as Bluetooth™, IEEE 802.11b (or other WiFi standards), Infrared Data Association (IrDa), and/or Radio Frequency Identification (RFID), for example.

The camera 10 may include a memory 110, which may be implemented using one or more standard memory devices. The memory devices may include, for instance, RAM 112, ROM 114, and/or EEPROM devices, and may also include magnetic and/or optical storage devices, such as hard disk drives, CD-ROM drives, and DVD-ROM drives. The camera 10 may also include an interface 120 coupled to an internal hard disk drive 130. The interface 120 may also be coupled to a removable memory 140, such as flash memory. In addition, the interface 120 may also be coupled to a magnetic floppy disk drive (not shown), an optical disk drive (not shown), or another drive and may be configured for external drive implementations, such as over a USB, IEEE 1194, or PCMCIA connection. Thus, the memory 140 may be physically removable from the camera 10 or data stored in the memory 140 may be accessed using a wired or wireless connection.

In one embodiment, any number of program modules are stored in the drives (e.g., drive 130) and ROM 114, including an operating system (OS) 150, one or more application programs 152 (e.g., image compression software), other program modules 154, and data 156. All or portions of the program modules may also be cached in RAM 112. Any suitable operating system 150 may be employed.

The camera 10 may include a battery 160 and a battery interface 162 for interfacing with battery 160, such as for charging battery 160 or detecting a charge level of battery 160. The battery 160 can be any electrical or electrochemical device, such as galvanic cells or fuel cells, and can be rechargeable or non-rechargeable. The battery 160 may be located inside of the camera 10 or attached to the outside of the camera 10. In the case of non-rechargeable batteries, the battery 160 may be physically detachable or removable from the camera 10. In the case of rechargeable batteries, the battery 160 may be recharged in any number of ways. For example, the battery 160 may be physically detachable or removable from the camera 10 to allow charging by an external battery charger (not shown). In addition, an access port 164 may be provided to provide a connection for an external battery charger.

Figure 21:
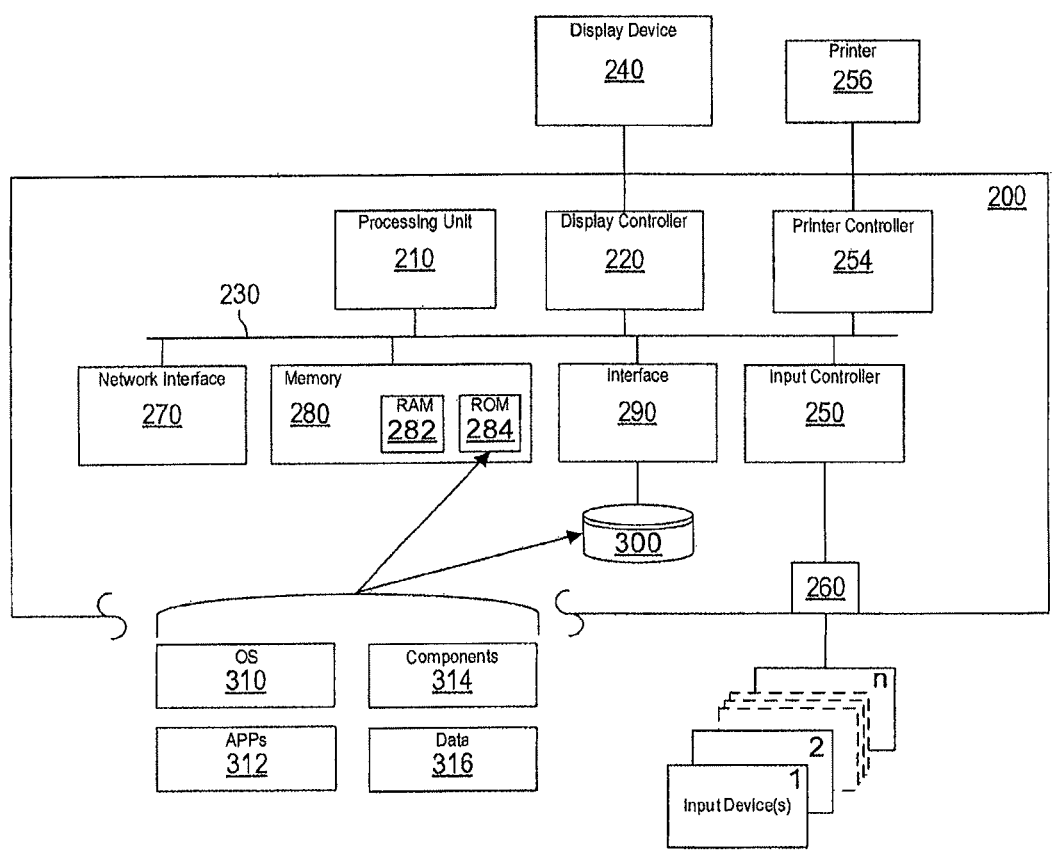
FIG. 21 is a block diagram showing operational components of an example computer.

As previously described, image data captured using the camera 10 can be transferred (e.g., using a wired or wireless connection or by removing the removable memory 140) to a computer for display on one or more of the previously described displays. FIG. 21 is a block diagram showing operational components of an example computer 200. The computer 200 includes a processor 210, which may be any commercially available processor or other logic machine capable of executing instructions. A display controller 220 is coupled to bus 230 and drives one or more display devices 240. The display device(s) 240 may comprise any of the display previously described with reference to FIGS. 10A, 11, and 16-18, or another display device suitable to presents data, photographs, menus, prompts, and otherwise communicates with the user.

The computer 200 may include a standard input controller 250 to receive user input from an input put device such as a pointing device or other wired/wireless input devices. Other input devices may include a microphone, touchscreen, touchpad, trackball, or the like. While the input devices may be integrated into the computer 200 and coupled to the processor 210 via the input controller 250, the input devices may also connect via other interfaces, such as a connector 260. The connector 260 may include one or more data interfaces, bus interfaces, wired or wireless network adapters, or modems for transmitting and receiving data. Accordingly, the input controller 250 may include hardware, software, and/or firmware to implement one or more protocols, such as stacked protocols along with corresponding layers. Thus, the connector 260 may function as a serial port (e.g., RS232), a Universal Serial Bus (USB) port, and/or an IR interface. The input controller 260 may also support various wired, wireless, optical, and other communication standards. In addition, a printer controller 254 is provided to interface with a printer 256 (e.g., via a bi-direction port, such as a IEEE 1284 parallel port, or a wired or wireless network connection).

A network interface 270 may be provided to communicate with an external network, another computer, or a camera. The network interface 270 may facilitate wired or wireless communication with other devices over a short distance (e.g., Bluetooth™) or nearly unlimited distances (e.g., the Internet). In the case of a wired connection, a data bus may be provided using any protocol, such as IEEE 802.3 (Ethernet), Advanced Technology Attachment (ATA), Personal Computer Memory Card International Association (PCM-CIA), and/or USB, for example. A wireless connection may use low or high powered electromagnetic waves to transmit data using any wireless protocol, such as Bluetooth™, IEEE 802.11b (or other WiFi standards), Infrared Data Association (IrDa), and/or Radio Frequency Identification (RFID), for example.

The computer 200 may include a memory 280, which may be implemented using one or more standard memory devices. The memory devices may include, for instance, RAM 282, ROM 284, and/or EEPROM devices, and may also include magnetic and/or optical storage devices, such as hard disk drives, CD-ROM drives, and DVD-ROM drives. The computer 200 may also include an interface 290 coupled to an internal hard disk drive 300. In addition, the interface 290 may also be coupled to a magnetic floppy disk drive (not shown), an optical disk drive (not shown), or another drive and may be configured for external drive implementations, such as over a USB, IEEE 1194, or PCM-CIA connection.

In one embodiment, any number of program modules are stored in the drives (e.g., drive 300) and ROM 284, including an operating system (OS) 310, one or more application programs 312 (e.g., image compression software), other program modules 314 (e.g., an image conversion module or any of the algorithms described with reference to FIGS. 13-15), and data 316. All or portions of the program modules may also be cached in RAM 282. Any suitable operating system 310 may be employed.

The methods and systems described herein may be implemented in and/or by any suitable hardware, software, firmware, or combination thereof. Accordingly, as used herein, a component or module may comprise hardware, software, and/or firmware (e.g., self-contained hardware or software components that interact with a larger system). A software module or component may include any type of computer instruction or computer executable code located within a memory device and/or transmitted as electronic signals over a system bus or wired or wireless network. A software module or component may, for instance, comprise one or more physical or logical blocks of computer instructions, which may be organized as a routine, program, object, component, data structure, etc., that performs one or more tasks or implements particular abstract data types.

In certain embodiments, a particular software module or component may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Embodiments may include various steps, which may be embodied in machine-executable instructions to be executed by processor 20, processor 210, or another processor. Alternatively, the steps may be performed by hardware components that include specific logic for performing the steps or by a combination of hardware, software, and/or firmware. A result or output from any step, such as a confirmation that the step has or has not been completed or an output value from the step, may be stored, displayed, printed, and/or transmitted over a wired or wireless network. For example, a captured image may be stored, displayed, or transmitted over a network.

Embodiments may be provided as a computer program product including a machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be via CD-ROM or via Internet download.

As previously discussed, the immersion vision system may be used for an immersive environment display of a standard computer operating system resulting in a display of icons and program windows that surround the viewer (see, e.g., FIG. 14). Each rectangular icon or program window appears to the viewer within the immersion vision screen as a rectangle within an immersive viewing environment through the manipulation of the flat, 2 dimensional image by one or more of the conversion algorithms previously discussed. Internet web sites can be visually immersive where the observer is within an environment.

Additionally, the immersion vision system may be used for image generation and display of three-dimensional computer simulation environments, including flight simulation, military tactical display, gaming environments, internet web sites and architectural and engineering computer design programs through the manipulation of XYZ Cartesian coordinates by one or more of the conversion algorithms previously discussed to display the three-dimensional information on the immersion vision viewing screen thereby immersing the viewer in the three-dimensional environment. Software applications may include 3-D design programs, 3-D internet websites, and 3-D simulation programs.

In one embodiment, the immersion vision system may be used as an improved security surveillance system where the viewer is surrounded by the image of a remote location being monitored with a camera having an immersion vision lens. The viewer may have the advantage of seeing the entire area under surveillance at one time without panning the image. The immersive image allows the viewer to observe the interaction between individuals physically separated within the area under observation, an observation not possible with current security surveillance systems.

In another embodiment, the immersion vision system may be used for the display of medical images such X-ray photographs, images generated during fluoroscopy, and images generated during magnetic resonance imaging (MRI). The images may be manipulated using one or more of the conversion algorithms previously discussed to display the three-dimensional information on the immersion vision viewing screen to immerse the viewer in the three-dimensional environment. The scanned medical data can be viewed as an image surrounding the viewer, where the viewer is perceiving the image as if they were small in scale and viewing the scanned data as if they are within the heart, lungs, stomach, vein or other structure of the body.

According to one embodiment, an immersion vision imaging system uses a mathematically defined Harris shape to capture, create, and display panoramic images, the immersion vision system. The system may include lenses, image collection devices, viewing screens and software algorithms, all based on a Harris shape, so that they may be used in conjunction to capture, create, and display panoramic pictures on a surface of a viewing screen that encloses a viewer (See, e.g., FIGS. 1 and 10A).

For example, a reflective camera lens may gather immersion vision images whose outermost reflective shape of the lens is defined as a Harris shape and consists of a surface that reflects all light headed to the viewing or station point SP to the camera point CP1 to capture panoramic images for use in the immersion vision system (See, e.g., FIG. 8). By way of another example, a refractive camera lens may gather immersion vision images and further comprise a series of refractive lenses to capture panoramic images formatted for use in the immersion vision system (See, e.g., FIG. 1). The immersion vision refractive lens design may utilize a Harris shape in the design of the lenses where the path of travel of the light through the lens passes through an imaginary picture plane IPP as it travels to the camera point CP, such that the image on the viewing plane VP2 is the exact, or reverse of the image on the viewing plane VP1 using the immersion vision reflective lens given that the source of the image is the same.

One or more software algorithms may use a Harris shape equation to computer generate immersion vision images for display on an immersion vision viewing screen (See, e.g., FIG. 13). For example, a mathematically defined Harris shape (See, e.g., FIG. 7) may be used in a Algorithm for the conversion of three-dimensional image data points (using the Cartesian coordinate system defined in terms of $X_O$, $Y_O$, $Z_O$), to points (defined as $X_{VP}$, $Y_{VP}$), for use on an immersion vision screen. Such an algorithm may be used in gaming and three-dimensional software programs to generate visual output to visually immerse the viewer in a panoramic image (see, e.g., FIG. 12A).

By way of another example, a software algorithm may use a Harris shape equation to computer generate images for viewing on an immersion vision viewing screen by modifying the format of two-dimensional images, defined in an XY plane for viewing in the immersion vision system. One example of this (X,Y) to ($X_{VP}$,$Y_{VP}$) algorithm is illustrated in FIG. 13 which converts two-dimensional or flat plane images such as still photographs, movie, television and computer images into a format to be viewed in the immersion vision environment. This algorithm may use a Harris shape to mathematically translate the (X,Y) Cartesian coordinates of a flat plane image, to points defined as ($X_{VP}$,$Y_{VP}$) for display on an immersion vision screen. This algorithm may be used to view a two-dimensional plane image as a flat plane with the image located within a perceived three-dimensional environment.

One or more software algorithms using the Harris shape equation may be used to mathematically translate the X-Y Cartesian coordinates of a flat plane image, to points defined as ($X_{VP}$,$Y_{VP}$) for display on an immersion vision screen. On example of this is the (X,Y) to ($X_{VP}$,$Y_{VP}$) algorithm illustrated in FIG. 14 which allows the flat desktop or background screen images to surround you on the immersion vision viewing screen. Additionally, operating system icons and software program windows may be displayed around the viewer. This algorithm may be used to view the two-dimensional window images as two-dimensional planes located within a perceived three-dimensional environment.

One or more software algorithms may use a Harris shape equation to mathematically translate the X-Y Cartesian coordinates of a flat plane image, to points defined as ($X_{VP}$,$Y_{VP}$) for display on an immersion vision screen. One example of this is the ($X_{VP}$,$Y_{VP}$) to (X,Y) algorithm illustrated in FIG. 15 which allows the images on the immersion vision viewing screen surrounding the user to be selected and cropped for printing in a standard (X,Y) image format. This algorithm may allow images to be captured in the immersion vision panoramic format and then selections to be printed as standard flat photo images.

One or more viewing screens may be used for viewing panoramic images in the shape defined as a Harris shape (See, e.g., FIG. 16). For example, a projection viewing immersion vision screen may comprise a viewing screen that employs projector technology, that is the source of light for image viewing, to project the image on the exterior convex surface of the viewing screen to be viewed on the interior or concave surface of the viewing screen. Additionally, a direct viewing immersion vision screen may comprise a viewing screen that employs technology, such as light emitting diodes (LED), that generate the light for image viewing at the surface of the viewing screen.

A shape of the vision station viewing screen may comprise a viewing screen measuring approximately 6 feet across the base and approximately 2 to 3 feet high used for one or two people to view images in the immersion vision format. As illustrated in FIG. 16 the Vision Station may be an ideal panoramic viewing environment for personal computing, security imaging, surfing the internet, computer gaming, 3D CAD design platform, and panoramic movie viewing.

A shape of the vision room viewing screen may comprise a viewing screen measuring approximately 7 to 20 feet across the base and approximately 3 to 9 feet high used for a room of people to view images in the immersion vision format. As illustrated in FIG. 17 the Vision Room may be an ideal panoramic viewing environment for panoramic movie viewing. group computing, computer gaming, and used for the viewing of any immersion vision images.

A shape of the vision theatre viewing screen may comprise a viewing screen measuring approximately 21 to 50 feet across the base and approximately 9 to 20 feet high used for a room of people to view images in the immersion vision format. As illustrated in FIG. 18 the vision theatre may be an ideal panoramic viewing environment for panoramic movie viewing. broadcast special events, classroom instruction, and may be used for the viewing of any immersion vision images.

The terms and descriptions used herein are set forth by way of illustration only and are not meant as limitations. Those skilled in the art will recognize that many variations can be made to the details of the above-described embodiments without departing from the underlying principles of the invention.

The terms and descriptions used herein are set forth by way of illustration only and are not meant as limitations. Those skilled in the art will recognize that many variations can be made to the details of the above-described embodiments without departing from the underlying principles of the invention. The scope of the invention should therefore be determined only by the following claims (and their equivalents) in which all terms are to be understood in their broadest reasonable sense unless otherwise indicated.

The invention claimed is:

1. A system for generating an anamorphic image from a non-anamorphic image, comprising:
   a memory for storing at least one dataset defining a non-anamorphic image; and
   a processor communicatively coupled to the memory, the processor configured to:
      convert a dataset defining a non-anamorphic image into at least one anamorphic image suitable for displaying on a viewing surface such that an image viewed on the viewing surface appears undistorted from a viewing point; and
      store the at least one anamorphic image in the memory.

2. A system as set forth in claim 1, wherein the non-anamorphic image comprises a two-dimensional image.

3. A system as set forth in claim 1, wherein the non-anamorphic image comprises a three-dimensional image.

4. A system as set forth in claim 1, further comprising:
   a shell sized to a least partially surround a viewer, the shell having a convex exterior surface opposite a concave interior surface, the concave interior surface at least partially defining the viewing surface and at least partially defined with respect to the viewing point and a focal point located on opposite sides of the viewing surface such that all light rays passing through the viewing surface and directed toward the viewing point would reflect off the viewing surface and intersect at the focal point if the viewing surface was reflective; and
   a projector communicatively coupled to the processor, wherein the shell and the projector are configured such that the projector projects the anamorphic image onto the convex exterior surface of the shell so that a viewer can view an image on the viewing surface that appears undistorted from a point of view.

5. A system as set forth in claim 1, further comprising:
   a display device sized to a least partially surround a viewer and having a concave interior surface at least partially defining the viewing surface and at least partially defined with respect to the viewing point and a focal point located on opposite sides of the viewing surface such that all light rays passing through the viewing surface and directed toward the viewing point would reflect off the viewing surface and intersect at the focal point if the viewing surface was reflective, wherein the display device is communicatively coupled to the processor and the display device is configured to display the anamorphic image such that a viewer can view an image on the viewing surface that appears undistorted from a point of view.

6. A system as set forth in claim 1, further comprising:
   a memory for storing at least one dataset defining an anamorphic image;
   a screen having a concave surface at least partially defining the viewing surface;
   an image source for displaying the anamorphic image on the viewing surface such that an image viewed on the viewing surface appears undistorted from a point of view;
   an input device configured to select a portion of the anamorphic image; and
   a processor communicatively coupled to the memory, the input device, and the image source, the processor configured to:
      convert the selected portion of the anamorphic image into at least one non-anamorphic image; and
      store the at least one non-anamorphic image in the memory.

7. A system as set forth in claim 1, further comprising:
   a printer communicatively coupled to the processor, and wherein the processor is further configured to print the at least one non-anamorphic image.

* * * * *